United States Patent
Arishima et al.

(10) Patent No.: US 7,630,009 B2
(45) Date of Patent: Dec. 8, 2009

(54) IMAGING SYSTEM, IMAGE SENSOR, AND METHOD OF CONTROLLING IMAGING SYSTEM

(75) Inventors: Yuu Arishima, Yokohama (JP); Hiroki Hiyama, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/130,189

(22) Filed: May 30, 2008

(65) Prior Publication Data

US 2008/0309806 A1 Dec. 18, 2008

(30) Foreign Application Priority Data

Jun. 18, 2007 (JP) ............... 2007-160683

(51) Int. Cl.
*H04N 3/14* (2006.01)
*H04N 5/225* (2006.01)

(52) U.S. Cl. ...................... 348/296; 348/362

(58) Field of Classification Search ........... 348/296, 348/362, 302, 308, 12
See application file for complete search history.

(56) References Cited

U.S. PATENT DOCUMENTS

| | | | |
|---|---|---|---|
| 5,471,242 A | 11/1995 | Kondo | 248/224 |
| 5,572,257 A | 11/1996 | Conrads et al. | 348/308 |
| 6,542,194 B1 | 4/2003 | Juen | 348/367 |
| 6,809,766 B1 * | 10/2004 | Krymski et al. | 348/296 |
| 6,847,026 B2 | 1/2005 | Koizumi et al. | 250/208.1 |
| 6,963,371 B2 | 11/2005 | Sakurai et al. | 348/301 |
| 7,355,645 B2 | 4/2008 | Sakurai et al. | 348/308 |
| 2004/0081446 A1* | 4/2004 | Compton | 396/362 |
| 2005/0195307 A1 | 9/2005 | Sakurai et al. | 348/308 |
| 2006/0238632 A1* | 10/2006 | Shah | 348/296 |
| 2007/0229686 A1 | 10/2007 | Hiyama et al. | 348/294 |
| 2007/0229687 A1 | 10/2007 | Hiyama et al. | 348/294 |
| 2008/0012976 A1 | 1/2008 | Sakurai et al. | 348/301 |

FOREIGN PATENT DOCUMENTS

| | | |
|---|---|---|
| JP | 2-117278 | 5/1990 |
| JP | 11-234573 | 8/1993 |
| JP | 5-260392 | 10/1993 |
| JP | 11-41523 | 2/1999 |

* cited by examiner

*Primary Examiner*—Timothy J Henn
(74) *Attorney, Agent, or Firm*—Fitzpatrick, Cella, Harper & Scinto

(57) ABSTRACT

An imaging system includes an image sensor and a mechanical shutter which controls the termination of exposure of the image sensor. The image sensor includes a pixel array in which a plurality of pixels are arrayed in a matrix, and a vertical scanning unit which scans the pixel array for each row. The vertical scanning unit executes in parallel some of the reset operations of pixels on at least two adjacent rows of the pixel array. The charge accumulation operation of pixels starts upon completion of the reset operation and terminates in response to light shielding by the mechanical shutter.

4 Claims, 21 Drawing Sheets

IMAGING SYSTEM, IMAGE SENSOR, AND METHOD OF CONTROLLING IMAGING SYSTEM

BACKGROUND OF THE INVENTION

1. Field of the Invention

The present invention relates to an imaging system, an image sensor, and a method of controlling the imaging system.

2. Description of the Related Art

An imaging system such as a digital camera sometimes uses an image sensor including a pixel array in which a plurality of pixels are arrayed in a matrix, as shown in FIG. 25. The following technique is proposed to control the charge accumulation operation of pixels on each row of the pixel array.

As a general technique, the start of the charge accumulation operation of pixels on each row of the pixel array is controlled by the pixel reset operation, and the completion of the charge accumulation operation is controlled by the read operation of signals from pixels.

As another technique, the start of the charge accumulation operation of pixels on each row is controlled by the pixel reset operation, and the completion of the charge accumulation operation is controlled by light shielding by a mechanical shutter (see Japanese Patent Laid-Open No. 11-041523), as shown in FIG. 26. According to this technique, the charge accumulation times of pixels on respective rows can be made equal by setting, in accordance with the traveling pattern of the mechanical shutter, the pattern of the timing when the reset operation of pixels on each row is completed.

According to the technique disclosed in Japanese Patent Laid-Open No. 11-041523, the reset operation of pixels on one row starts a predetermined period after the completion of the reset operation of pixels on another row.

For example, at the timing when the $K^{th}$ row selection period (K; natural number, K=k) starts, a reset signal $\phi$ RDk changes to a high level, and the reset operation of pixels on the $K^{th}$ row starts, as shown in FIG. 27. In the $K^{th}$ row selection period, the reset signal $\phi$ RDk changes to a low level, and the reset operation of pixels on the $K^{th}$ row terminates. After the reset operation of pixels on the $K^{th}$ row terminates and the $K^{th}$ row selection period terminates, the reset operation of pixels on the $(K+1)^{th}$ row starts.

It should be noted that, in FIGS. 25 and 27, $\phi$TRk denotes a transfer signal for turning on a transfer switch QTkj (j=1, 2, 3) to transfer a signal from a photodiode PDkj to a gate of a transistor QAkj, $\phi$ RDk denotes a reset signal for resetting the gate of the transistor QAkj, $\phi$ CKV1 and $\phi$ CKV2 denote scanning clock signals, $\phi$ PG denotes a reset control signal, $\phi$ RDR denotes a reset potential selection pulse, $\phi$ TRR denotes a reset pixel transfer selection pulse, $\phi$ RDS denotes a readout potential selection pulse, $\phi$ TRS denotes a readout pixel selection pulse, $\phi$ STVS denotes a readout start pulse, and $\phi$ STVR denotes a start pulse for reset operation.

The time during which the mechanical shutter passes each pixel on one row is shorter than that of a general electronic shutter. When the pattern of the timing of the completion of the reset operation is set in accordance with the traveling pattern of the mechanical shutter, the $K^{th}$ row selection period needs to be set shorter than that for a general electronic shutter. As a result, the period from the start to completion of the reset operation becomes short.

In this manner, when the reset operation of pixels on one row starts a predetermined period after the reset operation of pixels on another row is completed, the period from the start to completion of the reset operation shortens. In this case, charges accumulated in pixels may not be able to be adequately reset, and an image lag may appear in a photographed image.

SUMMARY OF THE INVENTION

The present invention provides an imaging system capable of reducing the generation of an image lag in a photographed image, an image sensor, and a method of controlling the imaging system.

According to the first aspect of the present invention, there is provided an imaging system comprising an image sensor and a mechanical shutter which controls termination of exposure of the image sensor, wherein the image sensor includes a pixel array in which a plurality of pixels are arrayed in a matrix, and a vertical scanning unit which scans the pixel array for each row, the vertical scanning unit executing in parallel at least a part of reset operations of pixels on at least two adjacent rows of the pixel array. A charge accumulation operation of the pixels starts upon completion of the reset operation and terminates in response to light shielding by the mechanical shutter, and the vertical scanning unit sequentially completes the reset operations of the pixels on at least two adjacent rows of the pixel array.

According to the second aspect of the present invention, there is provided an image sensor comprising a pixel array in which a plurality of pixels for which termination of a charge accumulation operation is determined by a mechanical shutter are arrayed in a matrix, and a vertical scanning unit which scans the pixel array for each row, wherein the vertical scanning unit executes in parallel at least a part of reset operations of pixels on at least two adjacent rows of the pixel array, the charge accumulation operation of pixels starts upon completion of the reset operation, and the vertical scanning unit sequentially completes the reset operations of the pixels on at least two adjacent rows of the pixel array.

According to the third aspect of the present invention, there is provided a method of controlling an imaging system having an image sensor and a mechanical shutter which controls termination of exposure of the image sensor, the method comprising performing, for each row of a pixel array in which a plurality of pixels are arrayed in a matrix in the image sensor, a start step of starting a pixel reset operation, a completion step of completing the pixel reset operation, and a light-shielding step of shielding pixels from light by the mechanical shutter, wherein the start step of pixels on a second row adjacent to a first row of the pixel array is performed before performing the completion step of pixels on the first row after performing the start step of the pixels on the first row of the pixel array, a charge accumulation operation of the pixels on the first row starts after performing the completion step of the pixels on the first row, and the charge accumulation operation of the pixels on the first row terminates after performing the light-shielding step of the pixels on the first row, and the completion step is performed sequentially for the pixels on the first row and the pixels on the second row.

The present invention can reduce generation of an image lag in a photographed image.

Further features of the present invention will become apparent from the following description of exemplary embodiments with reference to the attached drawings.

DESCRIPTION OF THE EMBODIMENTS

Figure 1:
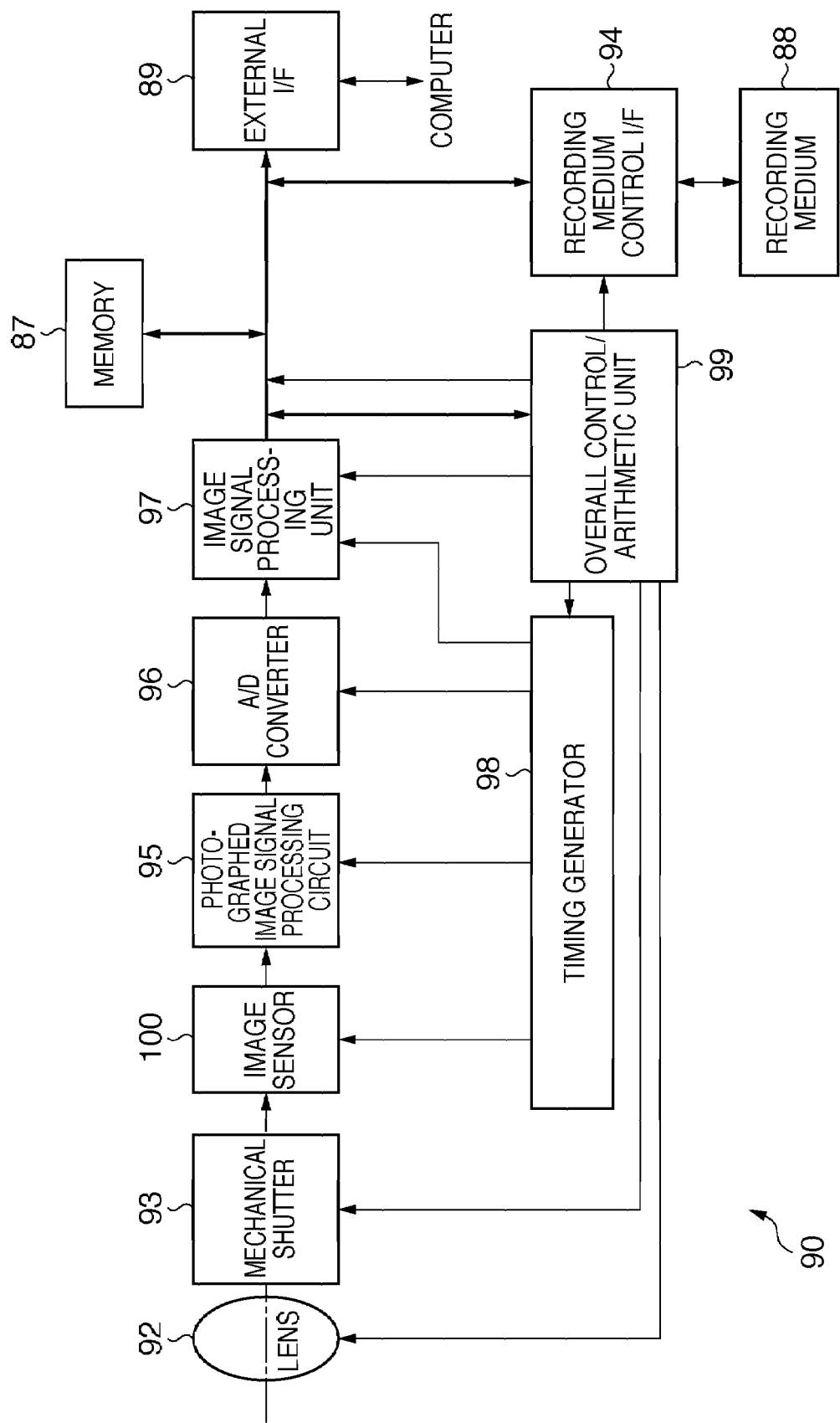
FIG. 1 is a block diagram showing the configuration of an imaging system according to the first embodiment of the present invention.

The schematic configuration of an imaging system 90 according to the first embodiment of the present invention will be described with reference to FIG. 1. FIG. 1 is a block diagram showing the configuration of the imaging system 90 according to the first embodiment of the present invention.

The imaging system 90 mainly comprises an optical system, an image sensor 100, and a signal processing unit. The optical system mainly comprises a photographing lens 92 and mechanical shutter 93. The signal processing unit mainly comprises a photographed image signal processing circuit 95, an A/D converter 96, an image signal processing unit 97, a memory 87, an external I/F 89, a timing generator 98, an overall control/arithmetic unit 99, a recording medium 88, and a recording medium control I/F 94. The signal processing unit need not comprise the recording medium 88.

The photographing lens 92 refracts incident light to form an object image on a pixel array PA of the image sensor 100.

The mechanical shutter 93 is interposed between the photographing lens 92 and the image sensor 100 on the optical path, and adjusts the quantity of light guided to the image sensor 100 after passing through the photographing lens 92. The mechanical shutter 93 has a mechanical front curtain (shutter curtain) and mechanical rear curtain (another shutter curtain) each including a plurality of light-shielding blades. The mechanical shutter 93 is switched between the opening state and the closing state by driving the mechanical front curtain and mechanical rear curtain at predetermined timings by the overall control/arithmetic unit 99.

The image sensor 100 converts an object image formed on the pixel array PA into an image signal. On the pixel array PA, a plurality of pixels are arrayed in a matrix. The image sensor 100 reads out and outputs the image signal from the pixel array PA.

The photographed image signal processing circuit 95 is connected to the image sensor 100, and processes an image signal output from the image sensor 100.

The A/D converter 96 is connected to the photographed image signal processing circuit 95, and converts a processed image signal (analog signal) output from the photographed image signal processing circuit 95 into a digital signal.

The image signal processing unit 97 is connected to the A/D converter 96, and performs various arithmetic processes, such as correction for an image signal (digital signal) output from the A/D converter 96, thereby generating image data. The image data is supplied to the memory 87, the external I/F 89, the overall control/arithmetic unit 99, the recording medium control I/F 94, and the like.

The memory 87 is connected to the image signal processing unit 97, and stores image data output from the image signal processing unit 97.

The external I/F 89 is connected to the image signal processing unit 97, and transfers image data output from the image signal processing unit 97 to an external device (e.g., personal computer) via the external I/F 89.

The timing generator 98 is connected to the image sensor 100, the photographed image signal processing circuit 95, the A/D converter 96, and the image signal processing unit 97, and supplies timing signals to them. The image sensor 100, the photographed image signal processing circuit 95, the A/D converter 96, and the image signal processing unit 97 operate in synchronism with the timing signals.

The overall control/arithmetic unit 99 is connected to the timing generator 98, the image signal processing unit 97, and the recording medium control I/F 94, and controls all of them.

The recording medium 88 is removably connected to the recording medium control I/F 94. Image data output from the image signal processing unit 97 is recorded on the recording medium 88 via the recording medium control I/F 94.

In this configuration, if the image sensor 100 can obtain a high-quality image signal, a high-quality image (image data) can be attained.

Figure 2:
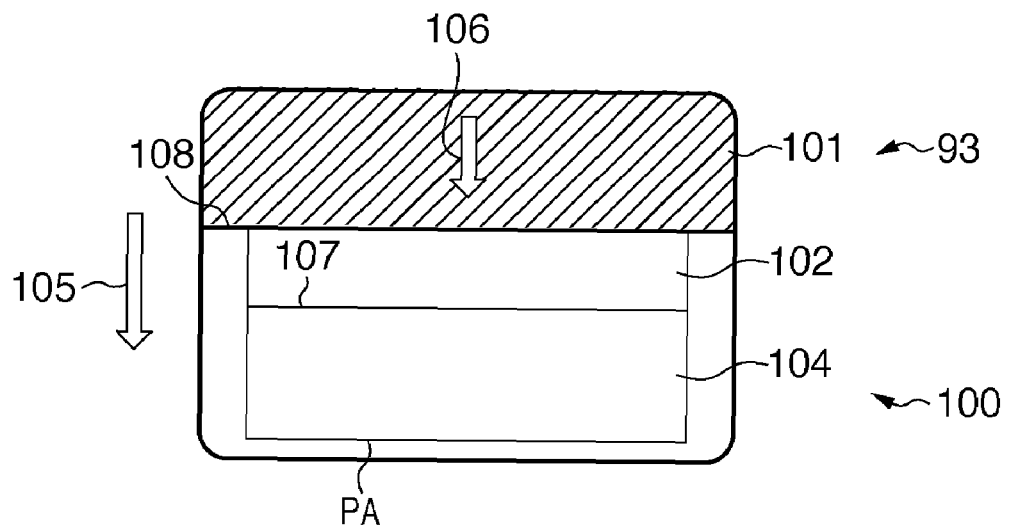
FIG. 2 is a view showing the layout of an image sensor and mechanical shutter.
Figure 3:
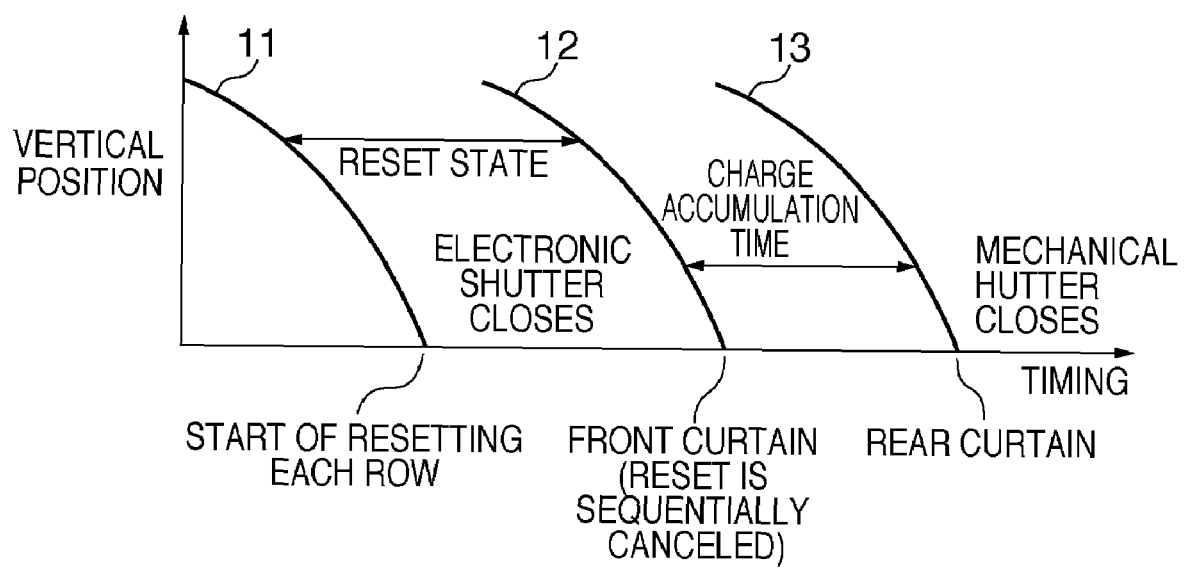
FIG. 3 is a view showing the operation timings of pixels on the respective rows of the pixel array of the image sensor.

The operations of the image sensor 100 and the mechanical shutter 93 in the imaging system 90 will be explained with reference to FIGS. 2 and 3. FIG. 2 is a view showing the layout of the image sensor 100 and the mechanical shutter 93. FIG. 3 is a view showing the operation timings of pixels on the respective rows of the pixel array PA of the image sensor 100. In FIG. 3, the abscissa axis represents the timing (time), and the ordinate axis represents the vertical position of each pixel in the pixel array PA.

FIG. 2 shows a surface of the image sensor 100 that faces the photographing lens 92, and the mechanical rear curtain serving as part of the mechanical shutter 93. More specifically, the pixel array PA is formed on the surface of the image sensor 100 that faces the photographing lens 92. In the pixel array PA, an opening is formed at a portion corresponding to the photoelectric converter of each pixel to capture light. In FIG. 2, the mechanical front curtain (not shown) of the mechanical shutter 93 is completely drawn vertically and open, and a mechanical rear curtain 101 extends from the top to a leading edge 108 and partially covers the pixel array PA. The mechanical front curtain and the mechanical rear curtain 101 of the mechanical shutter 93 travel in a direction indicated by an arrow 106 from the top surface to bottom surface of the housing (see a curve 13 shown in FIG. 3). The direction from the top surface to bottom surface of the housing coincides with a direction in which gravity acts on the imaging system 90 in a normal posture (posture in photographing).

A vertical scanning unit 220 (to be described later) performs reset start scanning (not shown in FIG. 2) to start the pixel reset operation in a direction indicated by the arrow 106 which is the same direction as the traveling direction of the mechanical rear curtain 101 (see a curve 11 shown in FIG. 3). The vertical scanning unit 220 performs reset completion scanning (see a reset completion scanning row 107) to complete the pixel reset operation so as to start the reset operation of pixels on the second row before the completion of the reset operation of pixels on the first row (see a curve 12 shown in FIG. 3). After executing reset start scanning from the top row to the bottom row of the pixel array PA, the vertical scanning unit 220 starts reset completion scanning from the top row of the pixel array PA. That is, the vertical scanning unit 220 executes in parallel part of the reset operations of pixels on at least two adjacent rows of the pixel array. In FIG. 2, after reset start scanning is performed from the top row to the bottom row of the pixel array PA, reset completion scanning is performed from the top row of the pixel array PA to the reset completion scanning row 107.

In the pixel array PA, an area below the reset completion scanning row 107 is a reset area 104 where the reset operation is being performed (in the reset state). More specifically, the vertical scanning unit 220 scans the reset completion scanning row 107 (electronic shutter operation) to cancel the state in which the reset area 104 is virtually shielded from light, instead of canceling the state by the mechanical front curtain. The reset completion scanning row 107 corresponds to the upper end of the mechanical front curtain when the mechanical front curtain covers the area 104.

A slit area 102 between the reset completion scanning row 107 and the leading edge 108 of the mechanical rear curtain 101 is an area (charge accumulation area) where charges are accumulated by exposure. The time until the mechanical rear curtain 101 cuts off light after the reset completion scanning row 107 passes, that is, upon completion of the pixel reset operation is a charge accumulation time during which the charge accumulation operation is performed at a specific pixel (see FIG. 3). In other words, the charge accumulation operation of a pixel starts in response to the completion of the reset operation, and terminates in response to light shielding by the mechanical shutter 93. The mechanical shutter 93 determines the charge accumulation operation of a pixel.

As described above, the start timing of the charge accumulation operation differs between the rows of the pixel array PA. The charge accumulation operation starts earliest on the top row of the pixel array PA, and starts last on the bottom row.

Since the mechanical rear curtain 101 is driven by a spring force and travels at a nonconstant speed, it travels at a speed in accordance with the curve 13. In FIG. 3, the curve 12 is obtained by translating the curve 13 to left by a distance corresponding to the charge accumulation time. As for a vertical transfer signal PV shown in FIG. 6, the interval of the rising edge of pulses to an adjacent row is longer on the side of the top row than on the side of the bottom row. In this way, the vertical scanning unit 220 completes the reset operations of pixels on at least two adjacent rows so that the period until the mechanical shutter 93 shields light upon completion of the reset operation becomes equal between the pixels on at least two adjacent rows.

In FIG. 3, the curve 11 is obtained by translating the curve 12 to left by a predetermined time. As for the vertical transfer signal PV shown in FIG. 5, the interval of the rising edge of pulses to an adjacent row is longer on the side of the top row than that on the side of the bottom row. The vertical scanning unit 220 performs the reset operations of pixels on at least two adjacent rows so that the period until the reset operation is completed after the start of the reset operation becomes equal between the pixels on at least two adjacent rows.

After the mechanical rear curtain 101 travels to the lower end of the pixel array PA and completely covers the pixel array PA, the vertical scanning unit 220 executes read scanning in a direction indicated by an arrow 105 which is the same direction as the traveling direction (direction indicated by the arrow 106) of the mechanical rear curtain 101. That is, the vertical scanning unit 220 performs read scanning sequentially from upper to lower rows. The read operation of pixels on respective rows is performed to sequentially read out object images. The image sensor 100 sequentially supplies image signals corresponding to the object images to the photographed image signal processing circuit 95.

Figure 4:
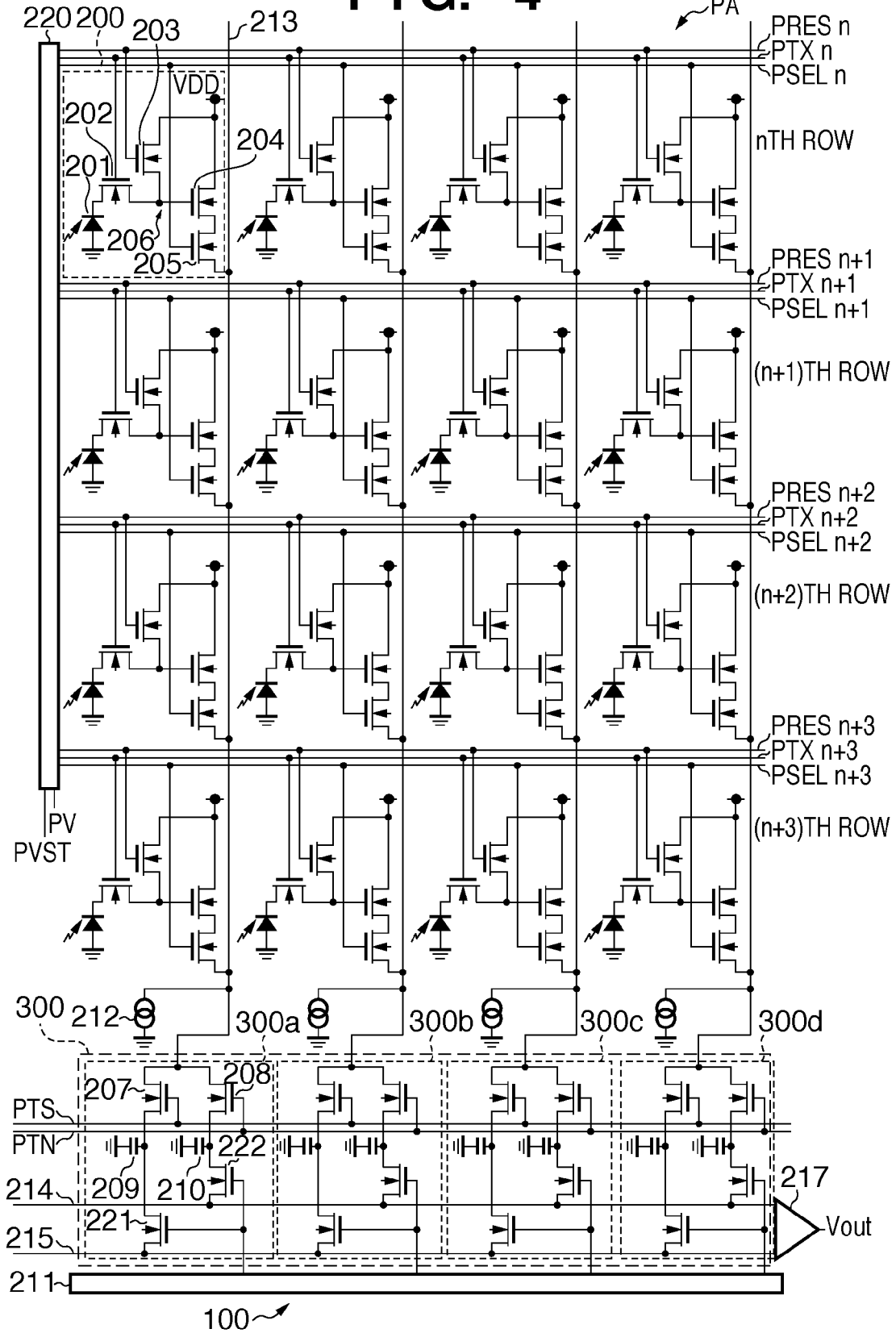
FIG. 4 is a circuit diagram showing the circuit configuration of the image sensor.

The arrangement and operation of the image sensor 100 will be described with reference to FIG. 4. FIG. 4 is a circuit diagram showing the circuit configuration of the image sensor 100.

The image sensor 100 comprises the pixel array PA, the vertical scanning unit 220, a horizontal scanning unit 211, an output circuit group 300, and an amplifier 217.

In the pixel array PA, a plurality of pixels 200 are arrayed in a matrix. The pixel array PA is an area having an opening where the optical image of an object is formed.

The vertical scanning unit 220 is arranged on the periphery of the pixel array PA. The vertical scanning unit 220 scans each row of the pixel array PA. For example, the vertical scanning unit 220 executes reset start scanning and reset completion scanning for each row. At this time, while vertically scanning the pixels 200, the vertical scanning unit 220 supplies a transfer signal PTX for resetting each pixel 200.

The output circuit group 300 is also on the periphery of and near the pixel array PA. The output circuit group 300 is a set of output circuits 300a, 300b, 300c, 300d arranged for respective columns. Each output circuit 300a, 300b, 300c, 300d is connected to a column signal line. Each output circuit 300a, 300b, 300c, 300d accumulate noise voltages and signal voltages received via the column signal lines.

The horizontal scanning unit 211 is arranged near the pixel array PA. A plurality of column selection signal lines vertically run from the horizontal scanning unit 211 to the output circuits 300a of the output circuit group 300 and the like. While horizontally scanning the output circuit group 300, the horizontal scanning unit 211 sequentially outputs noise voltages and signal voltages accumulated in the output circuits 300a and the like to the amplifier 217 for respective columns.

The amplifier 217 differentially amplifies the noise voltage and signal voltage to output an image signal (analog signal) to the subsequent photographed image signal processing circuit 95.

The arrangements and operations of the pixel 200 and output circuit 300a will be explained with reference to FIG. 4.

The pixel 200 comprises a photodiode (PD) 201, a transfer MOS transistor 202, a floating diffusion (FD) 206, an amplification MOS transistor 204, a selection MOS transistor 205, and a reset MOS transistor 203.

The PD 201 photoelectrically converts irradiated light and accumulates charges corresponding to the amount of exposure.

The transfer MOS transistor 202 receives the transfer signal PTX at the gate from the vertical scanning unit 220. When an active transfer signal PTX is supplied to the gate, the transfer MOS transistor 202 is turned on to transfer charges accumulated in the PD 201 to the FD 206. When an inactive transfer signal PTX is supplied to the gate, the transfer MOS transistor 202 is turned off, and the PD 201 starts charge accumulation.

The FD 206 holds transferred charges, and its potential changes from the reset potential in accordance with the transferred amount of charge. The FD 206 inputs a voltage corresponding to the changed potential to the amplification MOS transistor 204. That is, the FD 206 functions as the input of the amplification MOS transistor 204.

The amplification MOS transistor 204 receives at its gate a voltage corresponding to the potential of the FD 206. The amplification MOS transistor 204 amplifies the input voltage and outputs the amplified voltage to the selection MOS transistor 205. The amplification MOS transistor 204 performs a source follower operation together with a current source 212 and a load (not shown), and functions as an amplifier circuit.

The reset MOS transistor 203 receives a reset signal PRES at the gate from the vertical scanning unit 220. When an active reset signal PRES is supplied to the gate, the reset MOS transistor 203 is turned on to reset charges held in the FD 206. If an active transfer signal PTX is supplied to the gate of the transfer MOS transistor 202 and the transfer MOS transistor 202 is turned on, the reset MOS transistor 203 also resets charges accumulated in the PD 201 in addition to the FD 206.

The selection MOS transistor 205 receives a selection signal PSEL at the gate from the vertical scanning unit 220. When an active selection signal PSEL is supplied to the gate, the selection MOS transistor 205 is turned on to output a voltage input from the amplification MOS transistor 204 to a column signal line.

For example, when the charge accumulation operation starts in the PD 201, the potential of the FD 206 is the reset potential. At this time, if the selection signal PSEL supplied from the vertical scanning unit 220 to the gate of the selection MOS transistor 205 is made active, the selection MOS transistor 205 is turned on. Then, the noise voltage (voltage at reset noise level) prepared by amplifying a voltage corresponding to the reset potential of the FD 206 by the amplification MOS transistor 204 is output to a column signal line 213 (V output line) via the selection MOS transistor 205.

Alternatively, for example, if the transfer signal PTX supplied from the vertical scanning unit 220 to the transfer MOS transistor 202 changes from the inactive state to the active state upon the lapse of a predetermined time, the transfer MOS transistor 202 changes from the OFF state to the ON state. Then, charges accumulated in the PD 201 are transferred to the FD 206. Upon the lapse of the standby time until accumulated charges are read out, a signal voltage obtained by amplifying a voltage corresponding to the potential of the FD by the amplification MOS transistor 204 is output to the column signal line 213 via the selection MOS transistor 205.

The output circuit 300a comprises switches 207 and 208, a capacitor CTS 209, a capacitor CTN 210, and read switches 221 and 222.

When a signal PTS is active, the switch 207 is turned on to accumulate a signal voltage transferred via the column signal line in the capacitor CTS 209. When the signal PTS is inactive, the switch 207 is turned off to disconnect the column signal line from the capacitor CTS 209.

When a signal PTN is active, the switch 208 is turned on to accumulate a noise voltage transferred via the column signal line in the capacitor CTN 210. When the signal PTN is inactive, the switch 208 is turned off to disconnect the column signal line from the capacitor CTN 210.

When a signal PHS (not shown) is active, the read switch 221 is turned on to output a signal voltage accumulated in the capacitor CTS 209 to a horizontal output line 215. When a signal PHN (not shown) is inactive, the read switch 221 is turned off to disconnect the capacitor CTS 209 from the horizontal output line 215. In FIG. 4, the signals PHS and PHN are identical.

When the signal PHN is active, the read switch 222 is turned on to output a noise voltage accumulated in the capacitor CTN 210 to a horizontal output line 214. When the signal PHN is inactive, the read switch 222 is turned off to disconnect the capacitor CTN 210 from the horizontal output line 214.

The amplifier 217 differentially amplifies the noise voltage output to the horizontal output line 214 and the signal voltage output to the horizontal output line 215, generating an image signal (analog signal) Vout. The amplifier 217 outputs the image signal Vout to the subsequent photographed image signal processing circuit 95.

Figure 5:
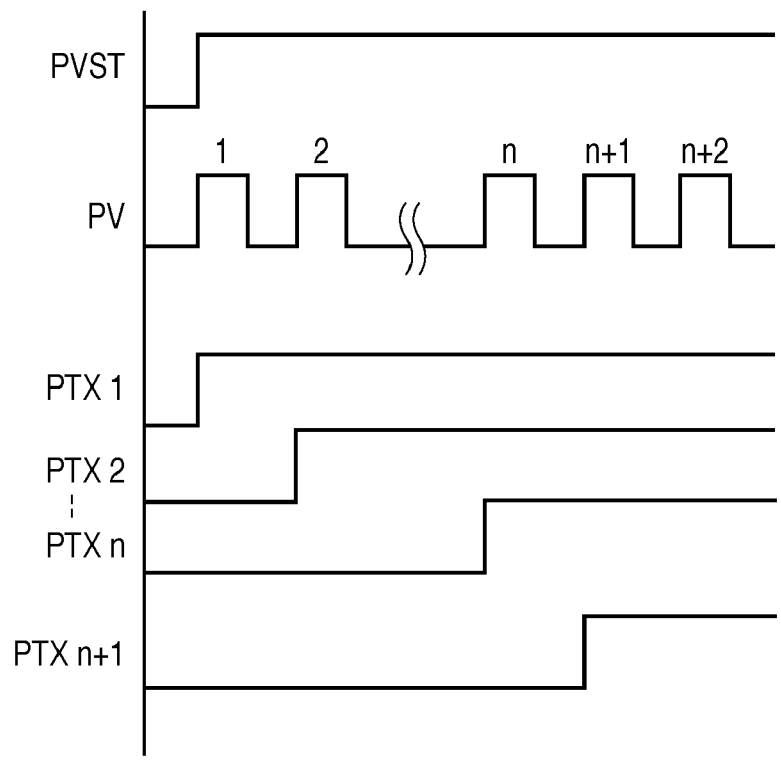
FIG. 5 is a timing chart showing the relationship between a vertical scanning signal and a transfer signal.
Figure 6:
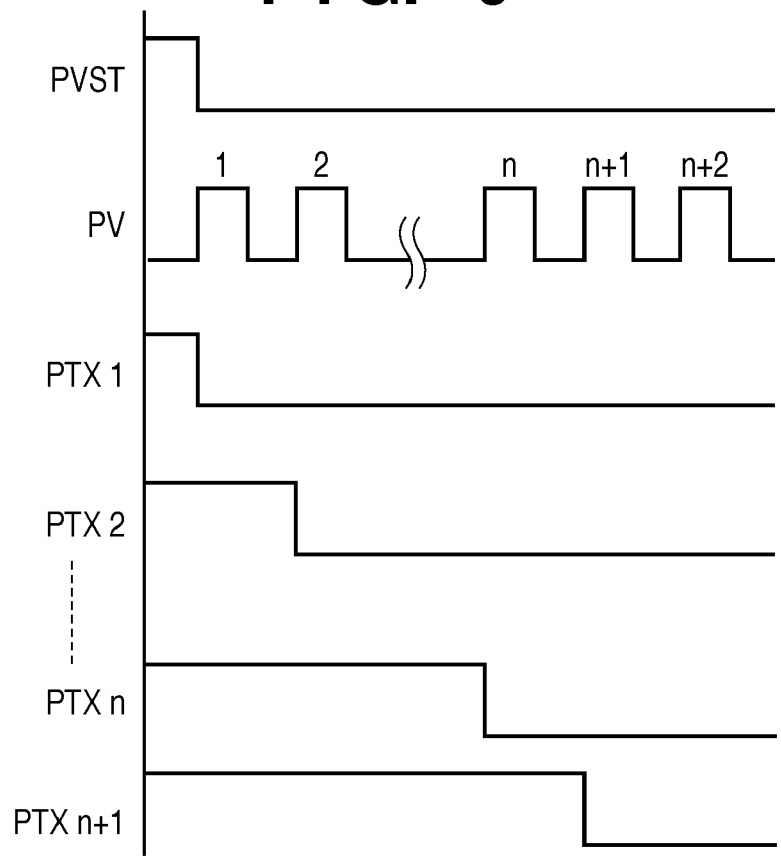
FIG. 6 is a timing chart showing the relationship between the vertical scanning signal and the transfer signal.
Figure 7:
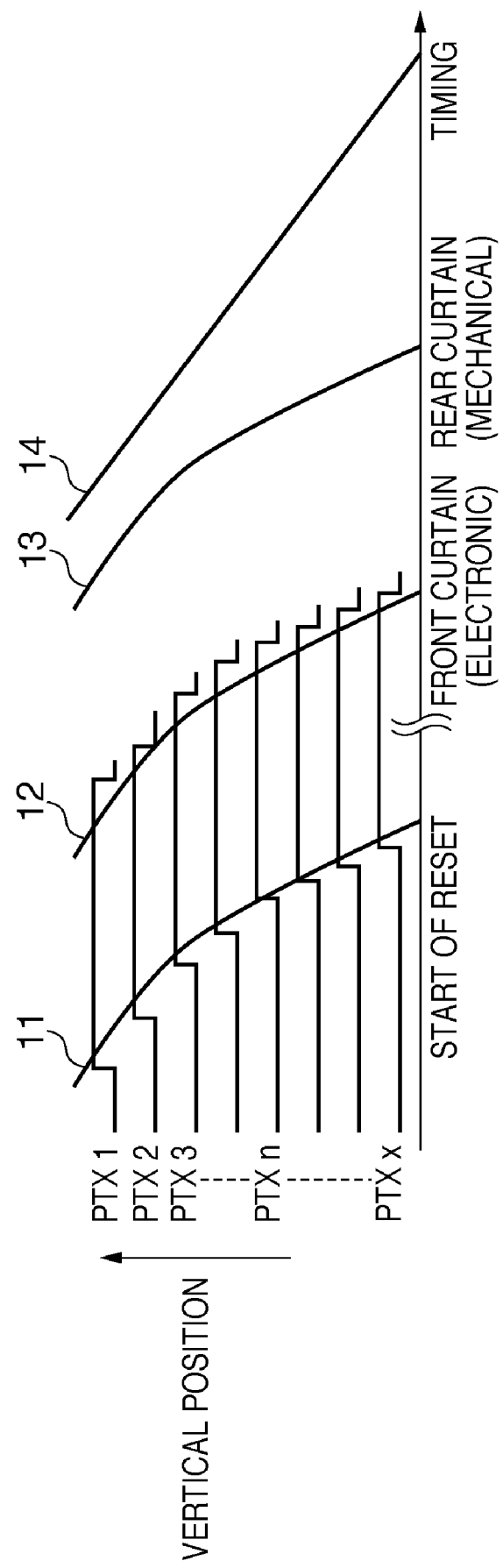
FIG. 7 is a view showing the operation timings of pixels on the respective rows of the pixel array of the image sensor.

The transfer signal PTX supplied from the vertical scanning unit 220 to each pixel will be explained with reference to FIGS. 5 to 7. FIGS. 5 and 6 are timing charts showing the relationship between the vertical scanning signal PV and the transfer signal PTX. FIG. 7 is a view showing the operation timings of pixels on the respective rows of the pixel array PA of the image sensor 100. FIG. 7 is basically the same as FIG. 3 except that the transfer signals PTX of pixels on the respective rows are superposed and a straight line (or curve) 14 of read scanning for reading out a signal from each pixel is further illustrated. A case where each signal becomes active at a high level will be exemplified.

As shown in FIG. 4, the vertical scanning unit 220 receives a vertical scanning start pulse PVST and the vertical scanning signal PV. Based on the vertical scanning start pulse PVST and the vertical scanning signal PV, the vertical scanning unit 220 generates a transfer signal PTX1 for the first row that is synchronized with the rising edge of a pulse of the vertical scanning signal PV for the first row, as shown in FIG. 5. The transfer signal PTX1 for the first row changes from a low level to a high level in synchronism with the rising edge of a pulse of the vertical scanning signal PV for the first row. Similarly, the vertical scanning unit 220 also generates a transfer signal PTX2, . . . for the second and subsequent rows. Then, transfer signals become active sequentially from the transfer signal of pixels on an upper row to that of pixels on a lower row. The reset operation starts sequentially from pixels on an upper row to those on a lower row. That is, the vertical scanning unit 220 sequentially starts the reset operations of pixels on at least two adjacent rows (see a curve 11 in FIG. 7).

Based on the vertical scanning start pulse PVST and the vertical scanning signal PV, the vertical scanning unit 220 generates the transfer signal PTX1 for the first row that is synchronized with the rising edge of a pulse of the vertical scanning signal PV for the first row, as shown in FIG. 6. The transfer signal PTX1 for the first row changes from a high level to a low level in synchronism with the leading edge of a pulse of the vertical scanning signal PV for the first row. Similarly, the vertical scanning unit 220 also generates the transfer signal PTX2, . . . for the second and subsequent rows. Then, transfer signals become inactive sequentially from the transfer signal of pixels on an upper row to that of pixels on a lower row. The reset operation is completed sequentially from pixels on an upper row to those on a lower row. That is, the vertical scanning unit 220 sequentially completes the reset operations of pixels on at least two adjacent rows (see a curve 12 in FIG. 7).

The charge accumulation operation of pixels on each row starts upon completion of the reset operation (the curve 12 in FIG. 7), and terminates upon light shielding by the mechanical shutter 93 (a curve 13 in FIG. 7). The vertical scanning unit 220 completes the reset operations of pixels on at least two adjacent rows so that the period until the mechanical shutter 93 shields light upon completion of the reset operation becomes equal between the pixels on at least two adjacent rows.

Since pixels can be reliably reset even when the electronic front curtain shutter is scanned at a high speed in accordance with the traveling pattern of the mechanical shutter, the possibility of the image lag problem can be reduced. That is, generation of an image lag in a photographed image can be reduced.

Pixels on at least two adjacent rows are reset so that the period until the reset operation is completed after the start of the reset operation becomes equal between the pixels on at least two adjacent rows. Since the time during which pixels on at least two adjacent rows can be made constant, in-plane nonuniformity of an image lag can be reduced.

Figure 8:
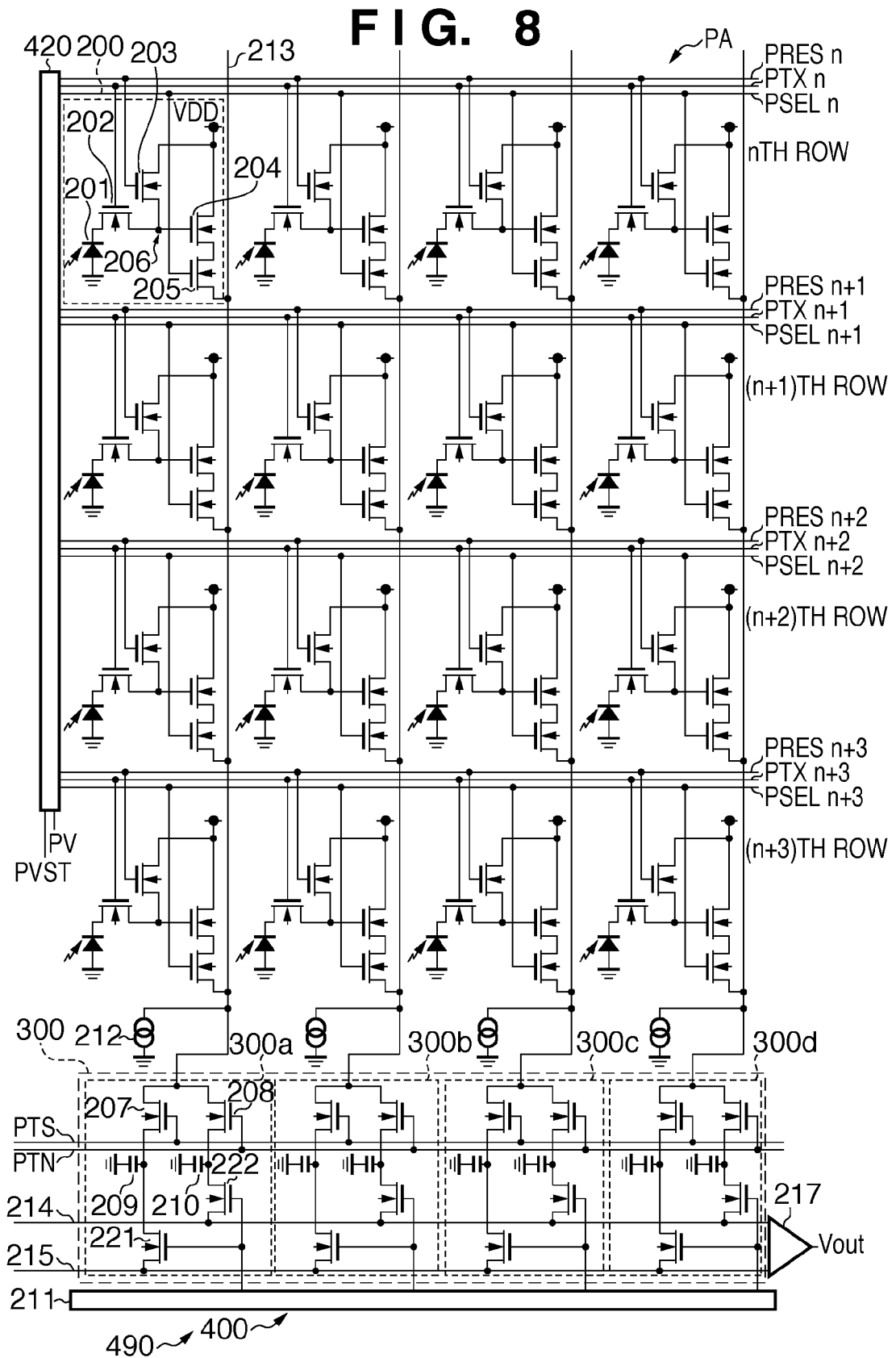
FIG. 8 is a circuit diagram showing the circuit configuration of another image sensor.
Figure 9:
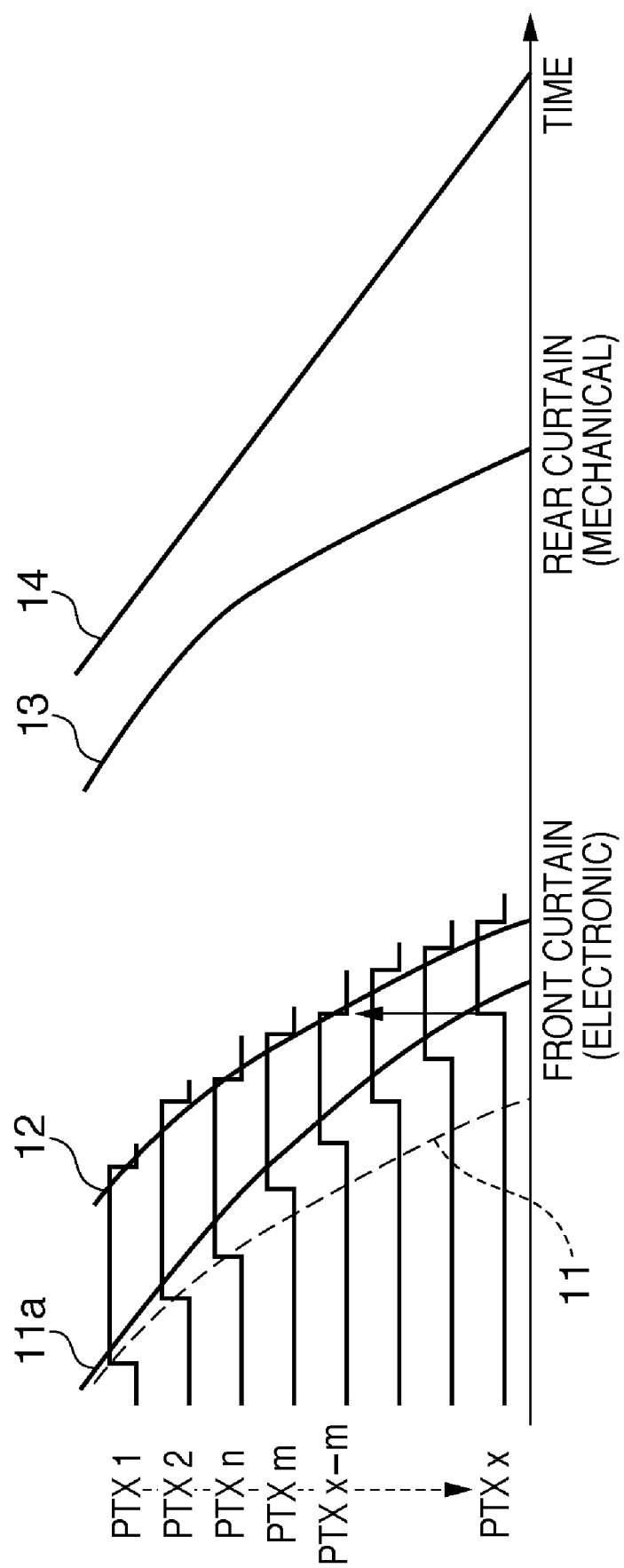
FIG. 9 is a view showing the operation timings of pixels on the respective rows of the pixel array of the image sensor.

An imaging system 490 according to the second embodiment of the present invention will be described with reference to FIGS. 8 and 9. FIG. 8 is a circuit diagram showing the circuit configuration of an image sensor 400. FIG. 9 is a view showing the operation timings of pixels on the respective rows of a pixel array PA of the image sensor 400.

The image sensor 400 of the imaging system 490 has the same basic arrangement as that in the first embodiment, but is different from the first embodiment in that the image sensor 400 comprises a vertical scanning unit 420.

As shown in FIG. 9, the vertical scanning unit 420 executes in parallel part of the reset operations of pixels on at least two adjacent rows. The vertical scanning unit 420 makes the period until the reset operation is completed after the reset operation starts longer on a row on which the passage speed of a leading edge 108 (see FIG. 2) of a mechanical rear curtain 101 is low than on a row on which the passage time of the leading edge 108 of the mechanical rear curtain 101 is high.

More specifically, as shown in FIG. 9, the vertical scanning unit 420 starts the reset operation of pixels so that the timing when the reset operation starts becomes later than that in the first embodiment (the curve 11a indicated by a solid line is drawn to the right side of the curve 11a). The time (to be referred to as a mechanical shutter passage time hereinafter) when the leading edge 108 of the mechanical rear curtain 101 (see FIG. 2) passes each row of the pixel array PA is obtained based on a curve 13 representing the traveling pattern of a mechanical shutter 93. The vertical scanning unit 420 delays the timing when the reset operation starts, so that the time of the reset operation of each row includes the mechanical shutter passage time from a row preceding by m rows to the target row. Then, the vertical scanning unit 420 starts the reset operation of pixels. In other words, the vertical scanning unit 420 sequentially starts the reset operations of pixels on m adjacent rows of the pixel array PA. The vertical scanning unit 420 completes the reset operation of pixels on the first row at the timing when the reset operation of pixels on the $m^{th}$ row starts. In this fashion, the vertical scanning unit 420 parallelly executes the reset operations of pixels on m adjacent rows. Note that m is an integer of 2 or more and is smaller than the number of all rows of the pixel array PA.

According to this driving method, the leading edge of a pulse of the vertical scanning signal PV for the $(n+m)^{th}$ row is used for reset start scanning of the $(n+m)^{th}$ row, and can also be used for reset completion scanning of the $n^{th}$ row. Since the time (time of the reset operation) from reset start scanning to reset completion scanning is shortened for pixels on each row, the time until the shutter is released can be shortened.

The reset periods of pixels on less than m rows adjacent to the initial row (top row) on which the reset operation of pixels starts first in the pixel array PA may also be set equal to the reset period of pixels on the initial row (top row) by the vertical scanning unit 420.

Figure 10:
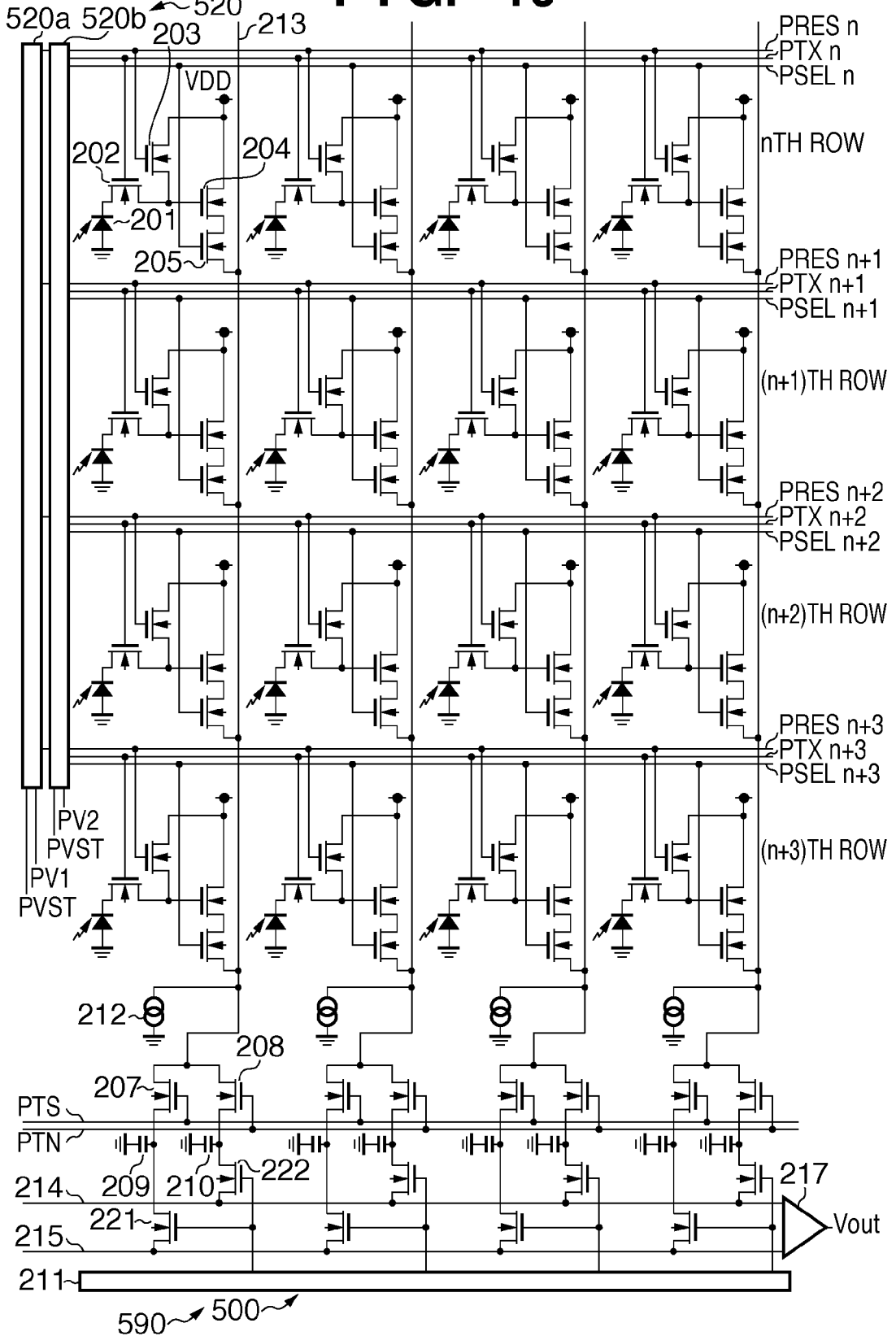
FIG. 10 is a circuit diagram showing the circuit configuration of another image sensor.
Figure 11:
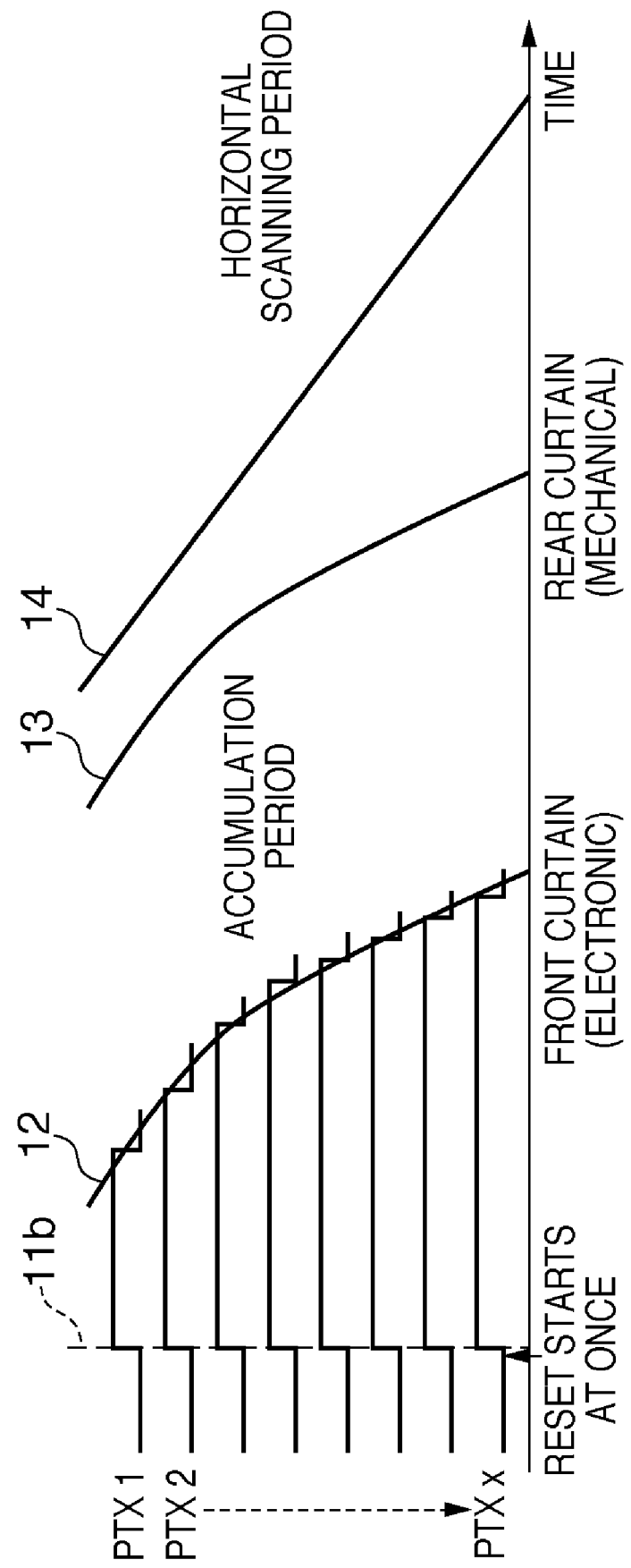
FIG. 11 is a view showing the operation timings of pixels on the respective rows of the pixel array of the image sensor.

An imaging system 590 according to the third embodiment of the present invention will be described with reference to FIGS. 10 and 11. FIG. 10 is a circuit diagram showing the circuit configuration of an image sensor 500. FIG. 11 is a view showing the operation timings of pixels on the respective rows of a pixel array PA of the image sensor 500.

The image sensor 500 of the imaging system 590 has the same basic arrangement as that in the first embodiment, but is different from the first embodiment in that a vertical scanning unit 520 includes a first vertical scanning unit 520a and second vertical scanning unit 520b.

The first vertical scanning unit 520a executes reset start scanning at once for the pixels of the pixel array PA. The second vertical scanning unit 520b executes reset completion scanning sequentially for the pixels of the pixel array PA. That is, the vertical scanning unit 520 starts at once the reset operations of pixels on at least two adjacent rows (see a straight line 11b in FIG. 11), and sequentially completes the reset operations of the pixels on at least two adjacent rows (see a curve 12 in FIG. 11).

Figure 12:
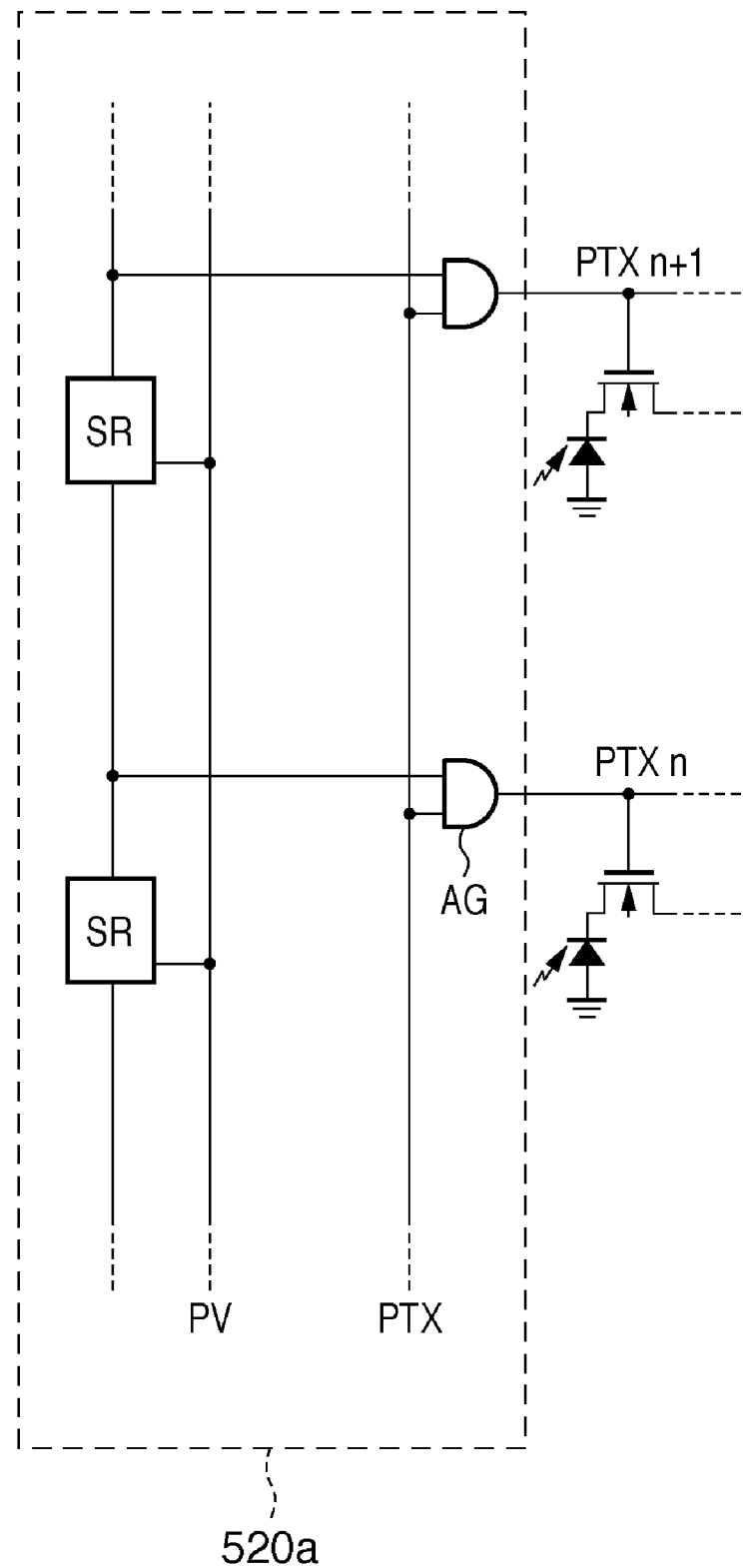
FIG. 12 is a circuit diagram showing the circuit configuration of the first vertical scanning unit.
Figure 13:
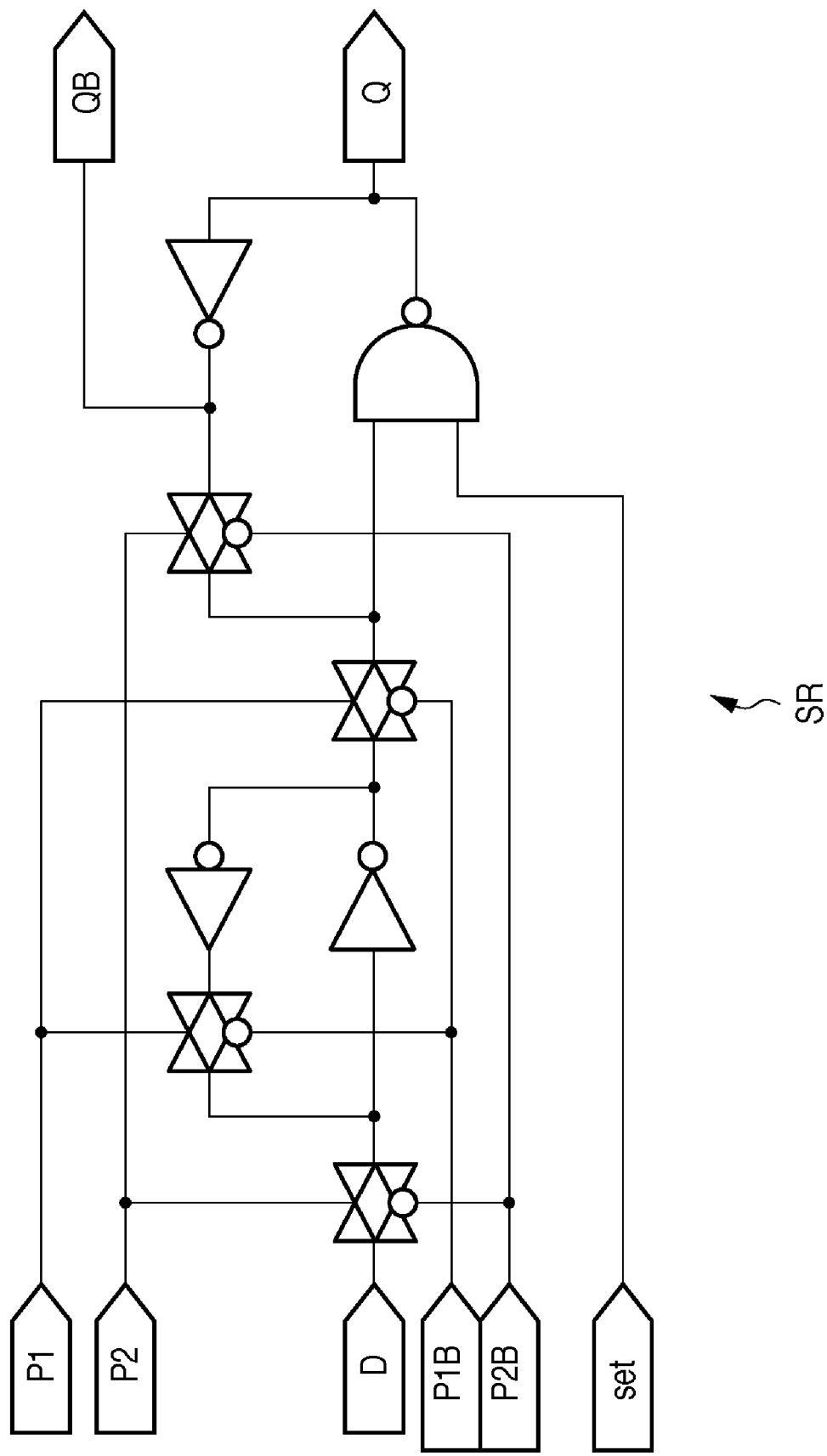
FIG. 13 is a circuit diagram showing the logical configuration of a shift register.

The arrangement of the first vertical scanning unit 520a will be described with reference to FIGS. 12 and 13. FIG. 12 is a circuit diagram showing the circuit configuration of the first vertical scanning unit 520a. FIG. 13 is a circuit diagram showing the logical configuration of a shift register SR.

As shown in FIG. 12, the first vertical scanning unit 520a includes the shift register SR and an AND gate AG in correspondence with each row of the pixel array PA. The shift register SR receives a vertical scanning signal PV. The AND gate AG receives an output signal Q from the shift register SR and an externally input transfer signal PTX. The AND gate AG output a transfer signal PTXn for pixels on each row as an AND of the signals Q and PTX.

Figure 14:
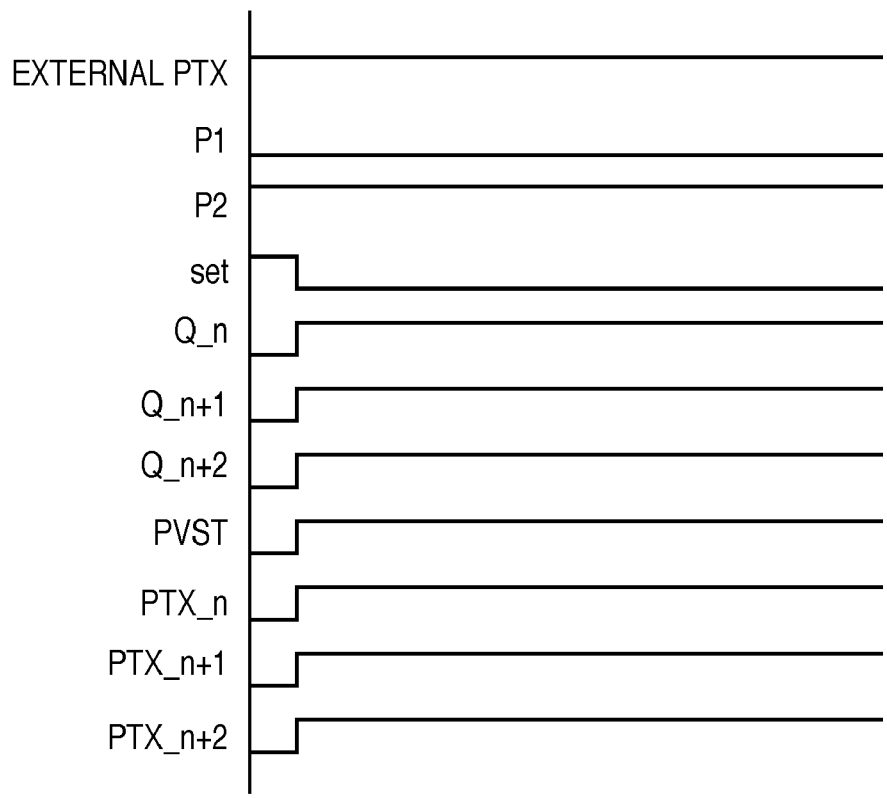
FIG. 14 is a timing chart showing the operation of a vertical scanning unit.

The shift register SR receives shift pulses P1 and P2 generated based on the vertical scanning signal PV. The shift register SR also receives inverted shift pulses P1B and P2B generated by inverting the logics of the shift pulses P1 and P2. As shown in FIG. 14, the shift pulses P1 and P2 are generated so that their high-level periods do not overlap each other.

The shift register SR includes, for example, a logical configuration shown in FIG. 13. In the shift register SR, the shift pulses P1 and P2 and inverted shift pulses P1B and P2B are input to terminals P1, P2, P1B, and P2B, respectively. In the shift register SR, the output Q from a preceding shift register SR, that is, data of a vertical scanning start pulse PVST is input to a terminal D. Further in the shift register SR, the pulse PVST input to the terminal D is output from an output terminal Q to a subsequent shift register SR via a NAND gate in accordance with the shift pulses P1 and P2 and inverted shift pulses P1B and P2B.

The operation of the vertical scanning unit 520 will be explained with reference to FIG. 14. FIG. 14 is a timing chart showing the operation of the vertical scanning unit 520.

The shift register SR can simultaneously change all rows to the reset start state because it can forcibly output high-level data by inputting low-level data by a set signal set from a NAND gate arranged on the input side of the terminal Q (see FIG. 13). More specifically, the set signals set simultaneously a change from a high level to a low level (active level) in the shift registers SR corresponding to pixels on respective rows, as shown in FIG. 14. At this timing, the shift registers SR corresponding to pixels on respective rows output output signals Q_1, Q_2, ... which simultaneously change from a low level to a high level. At this time, the externally input transfer signal PTX remains at a high level, so the AND gates AG (see FIG. 12) corresponding to pixels on respective rows output transfer signals PTX1, PTX2, ... which simultaneously change from a low level to a high level.

Since reset start scanning is executed at once using an external input, the reset operation can start at a higher speed.

Figure 15:
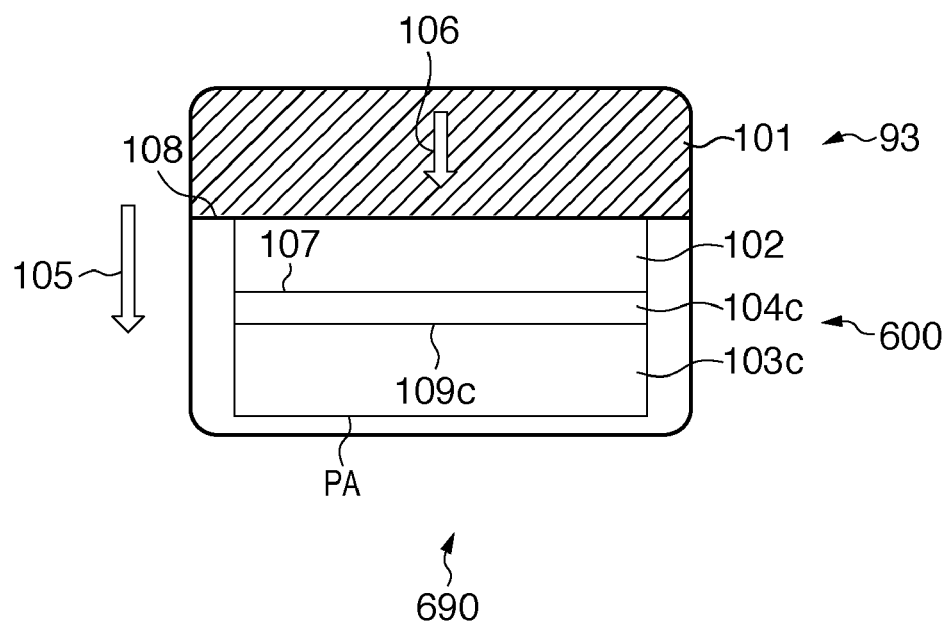
FIG. 15 is a view showing the layout of an image sensor and mechanical shutter.
Figure 16:
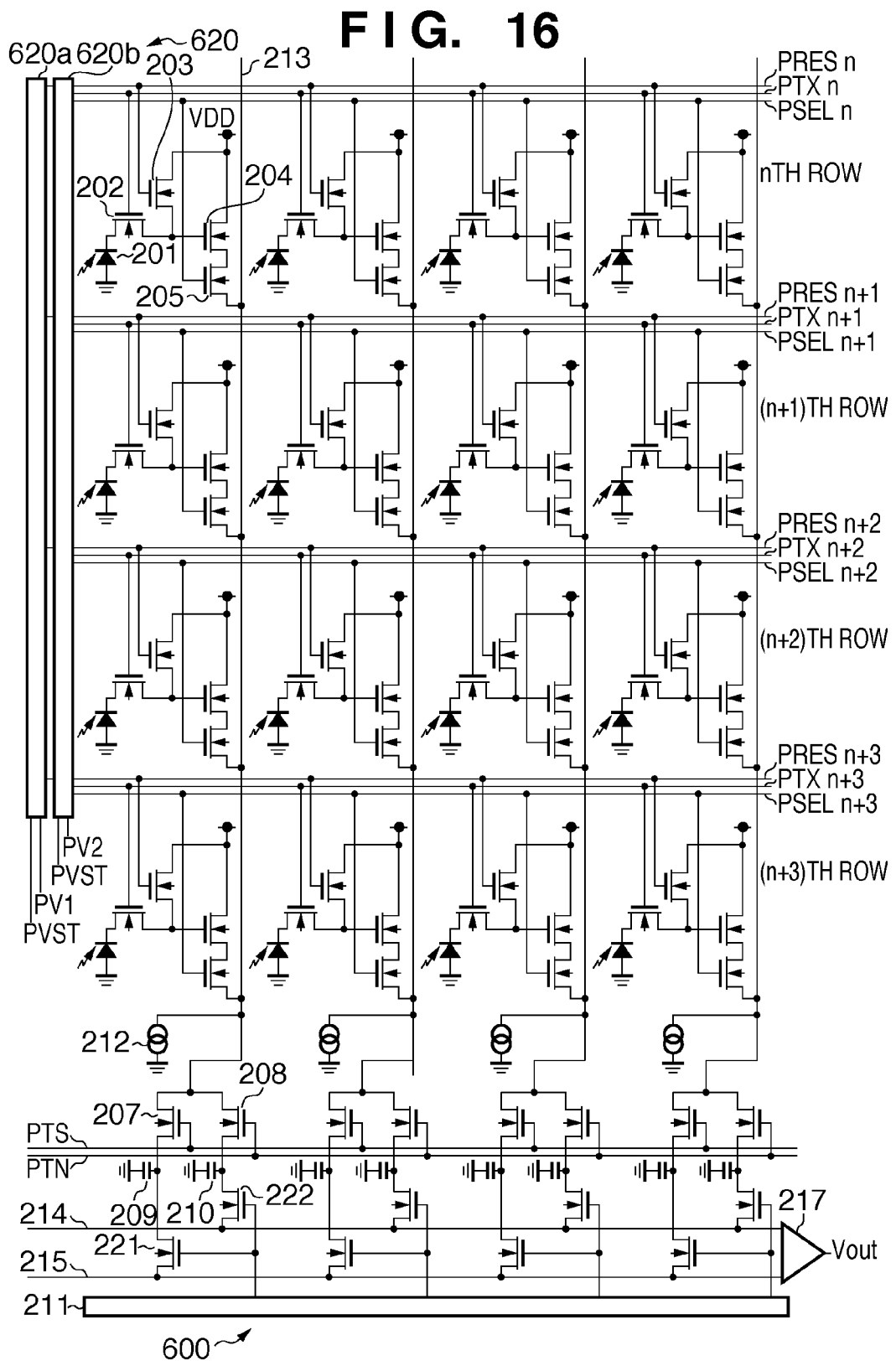
FIG. 16 is a circuit diagram showing the circuit configuration of the image sensor.
Figure 17:
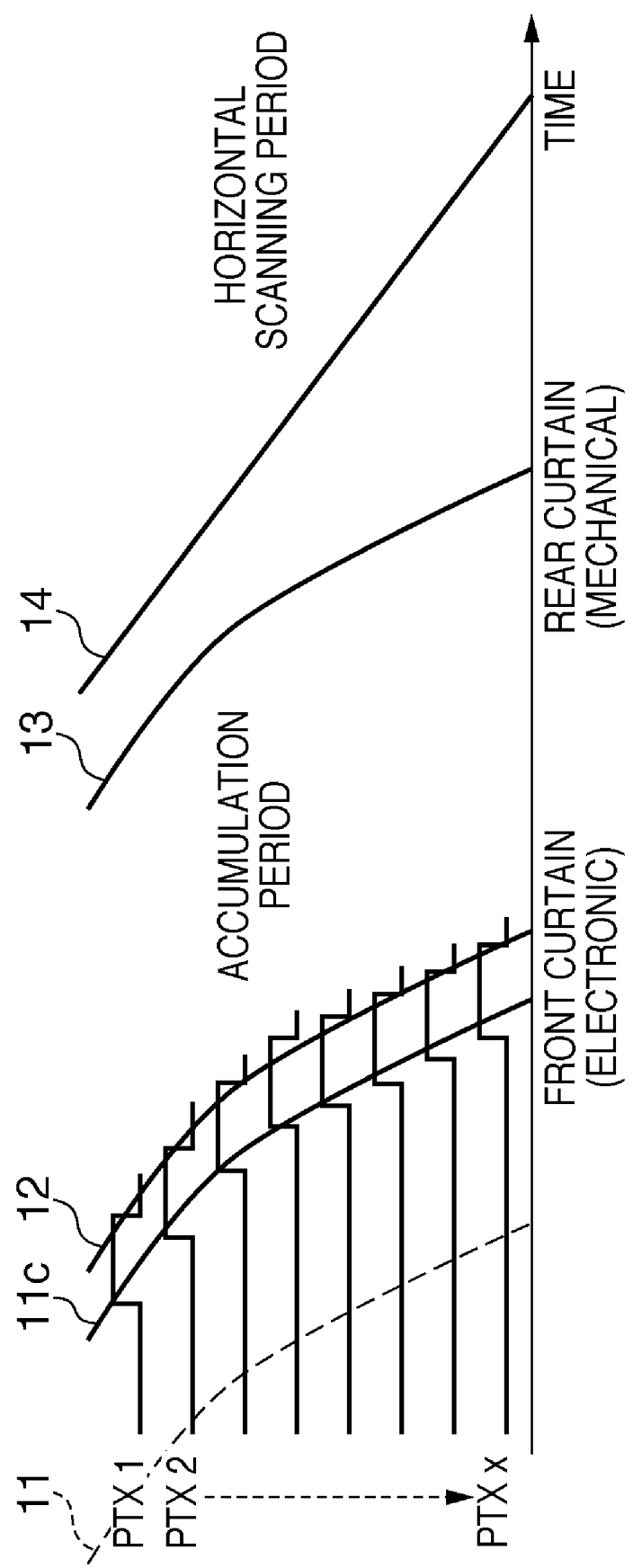
FIG. 17 is a view showing the operation timings of pixels on the respective rows of the pixel array of the image sensor.

An imaging system 690 according to the fourth embodiment of the present invention will be described with reference to FIGS. 15 to 17. FIG. 15 is a view showing the layout of an image sensor 600 and mechanical shutter 93. FIG. 16 is a circuit diagram showing the circuit configuration of the image sensor 600. FIG. 17 is a view showing the operation timings of pixels on the respective rows of a pixel array PA of the image sensor 600.

The image sensor 600 is different from the first embodiment in the operations of the image sensor 600 and the mechanical shutter 93, as shown in FIG. 15.

A vertical scanning unit 620 (to be described later) starts reset completion scanning from the top row of the pixel array PA before executing reset start scanning down to the bottom row after starting reset start scanning from the top row of the pixel array PA.

In the pixel array PA, an area between a reset start scanning row 109c and a reset completion scanning row 107 is a reset area 104c where the reset operation progresses (in the reset state). An area 103c below the reset start scanning row 109c is an area where pixels are to be reset. More specifically, the vertical scanning unit 620 scans the reset area 104c (electronic shutter operation) to virtually shield the reset area 104c and the area 103c below it from light, instead of shielding them by the mechanical front curtain. A reset completion scanning row 107 corresponds to the upper end of the mechanical front curtain when the mechanical front curtain covers the reset area 104c and the area 103c.

The image sensor 600 of the imaging system 690 has the same basic arrangement as that in the first embodiment, but is different from the first embodiment in that the vertical scanning unit 620 includes a first vertical scanning unit 620a and second vertical scanning unit 620b.

The first vertical scanning unit 620a executes reset start scanning sequentially for the pixels of the pixel array PA. The second vertical scanning unit 620b executes reset completion scanning sequentially for the pixels of the pixel array PA. That is, the vertical scanning unit 620 sequentially starts the reset operations of pixels on at least two adjacent rows (a curve 11c in FIG. 17), and sequentially completes the reset operations of the pixels on at least two adjacent rows (a curve 12 in FIG. 17) before the reset operation of the bottom row starts.

Figure 18:
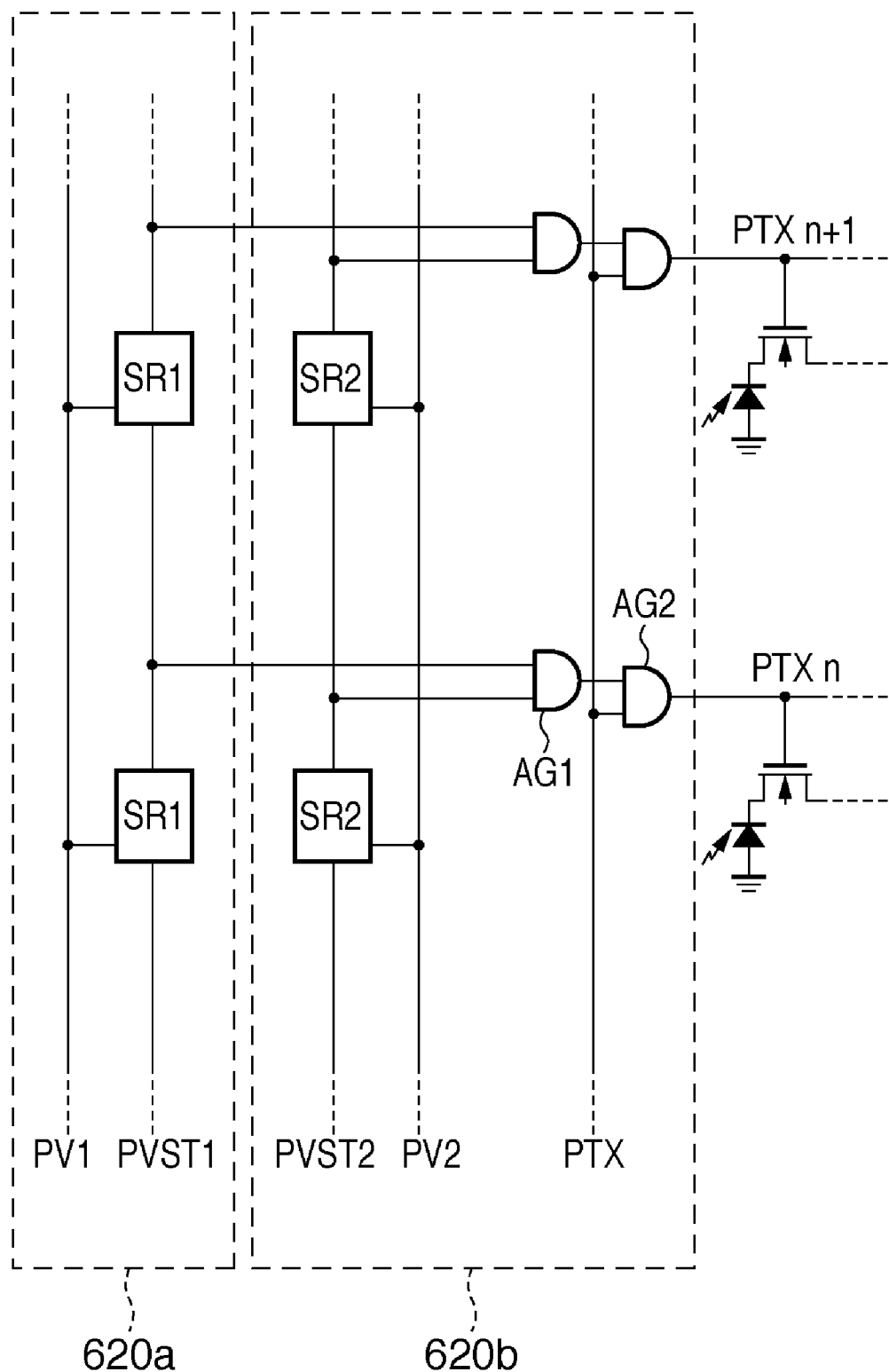
FIG. 18 is a circuit diagram showing the circuit configurations of the first and second vertical scanning units.
Figure 19:
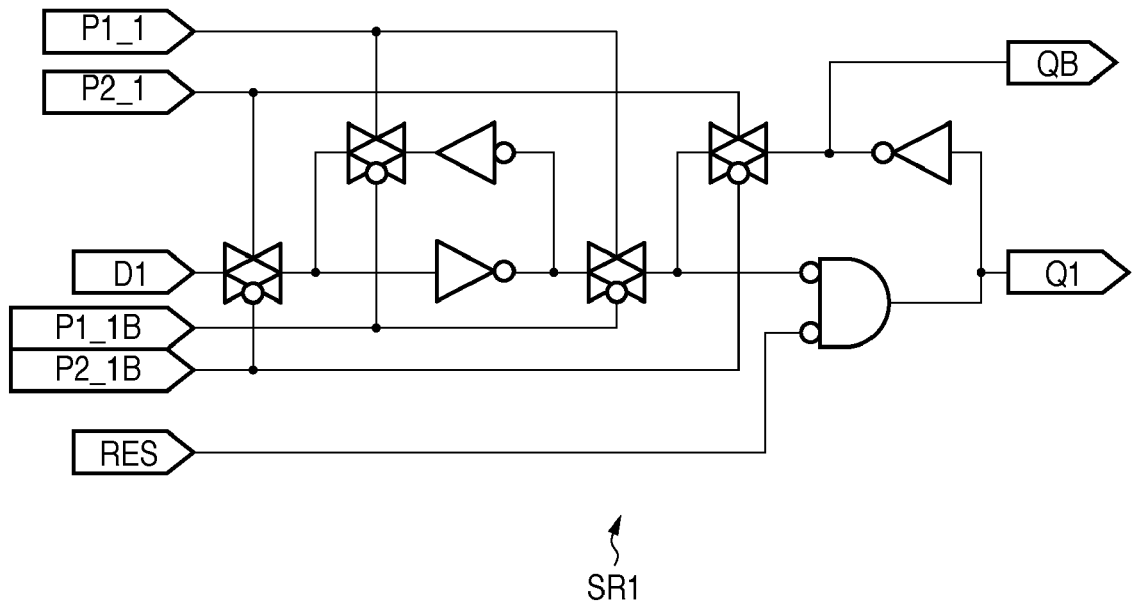
FIG. 19 is a circuit diagram showing the logical configuration of a shift register.
Figure 20:
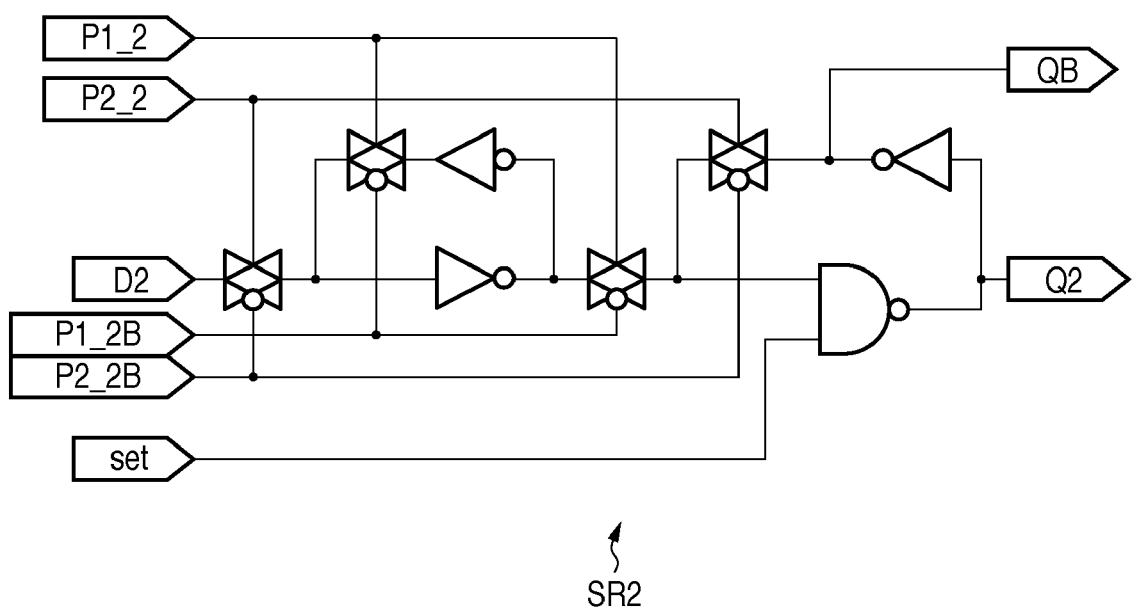
FIG. 20 is a circuit diagram showing the logical configuration of another shift register.

The arrangements of the first vertical scanning unit 620a and the second vertical scanning unit 620b will be described with reference to FIGS. 18 to 20. FIG. 18 is a circuit diagram showing the circuit configurations of the first vertical scanning unit 620a and the second vertical scanning unit 620b. FIG. 19 is a circuit diagram showing the logical configuration of a shift register SR1. FIG. 20 is a circuit diagram showing the logical configuration of a shift register SR2.

As shown in FIG. 18, the first vertical scanning unit 620a includes the shift register SR1 in correspondence with each row of the pixel array PA. The second vertical scanning unit 620b includes the shift register SR2 and AND gates AG1 and AG2 in correspondence with each row of the pixel array PA. The shift register SR1 receives a vertical scanning signal PV1. The shift register SR2 receives a vertical scanning signal PV2. The AND gate AG1 receives an output signal Q1 from the shift register SR1 and an output signal Q2 from the shift register SR2. The AND gate AG1 ANDs these signals to generate and output an output signal Q12. The AND gate AG2 receives the output signal Q12 from the AND gate AG1 and an externally input transfer signal PTX. The AND gate AG2 ANDs these signals to generate and output a transfer signal PTXn for pixels on each row.

Figure 21:
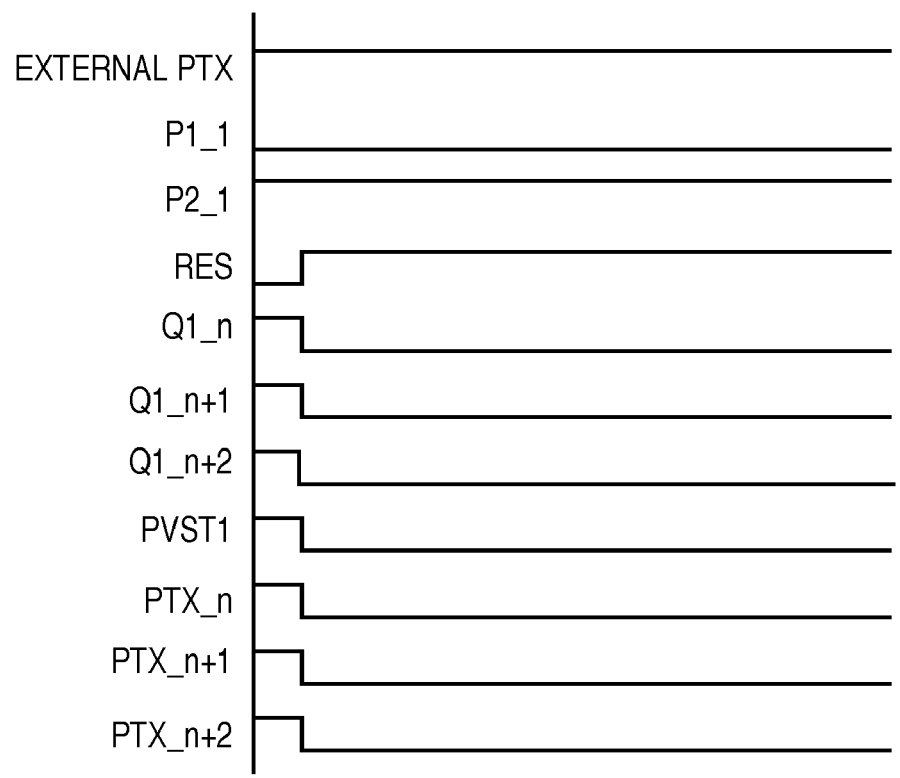
FIG. 21 is a timing chart showing the operation of the vertical scanning unit.
Figure 22:
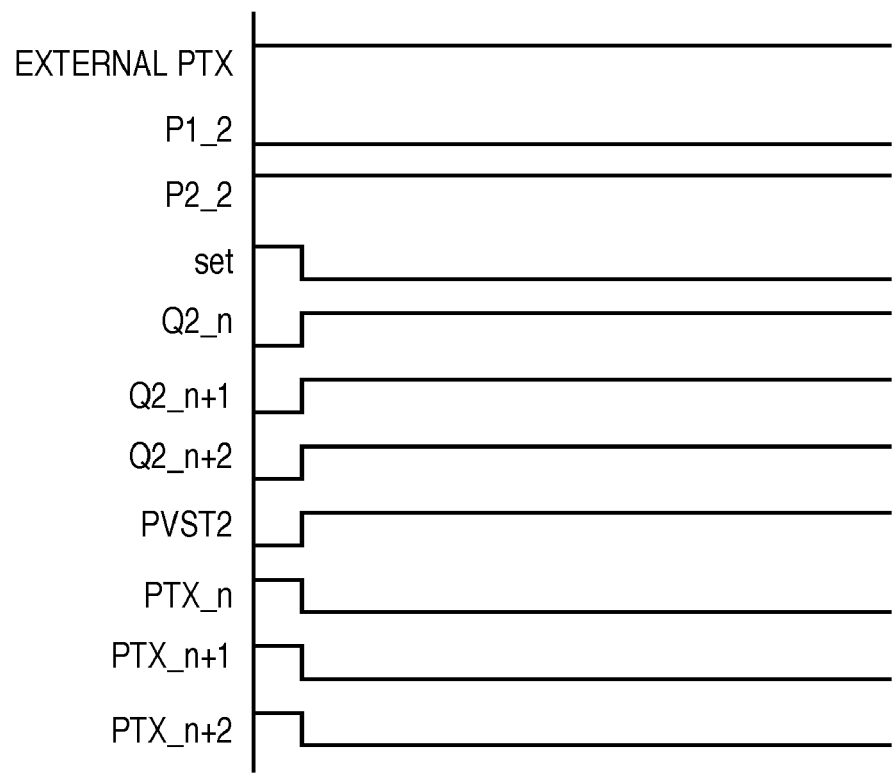
FIG. 22 is a timing chart showing the operation of the vertical scanning unit.

The shift register SR1 receives shift pulses P1_1 and P2_1 generated based on the vertical scanning signal PV1. The shift register SR1 also receives inverted shift pulses P1_1B and P2_1B generated by inverting the logics of the shift pulses P1_1 and P2_1. As shown in FIGS. 21 and 22, the shift pulses P1_1 and P2_1 are generated so that their high-level periods do not overlap each other.

The shift register SR1 includes, for example, a logical configuration shown in FIG. 19. In the shift register SR1, the shift pulses P1_1 and P2_1 and inverted shift pulses P1_1B and P2_1B are input to terminals P1_1, P2_1, P1_1B, and P2_1B, respectively. In the shift register SR1, the output Q1 from a preceding shift register SR1, that is, data corresponding to a vertical scanning start pulse PVST1 is input to a terminal D1. Further in the shift register SR1, the pulse PVST1 input to the terminal D1 is output from an output terminal Q1 to a subsequent shift register SR1 via a NAND gate in accordance with the shift pulses P1_1 and P2_1 and inverted shift pulses P1_1B and P2_1B.

Figure 23:
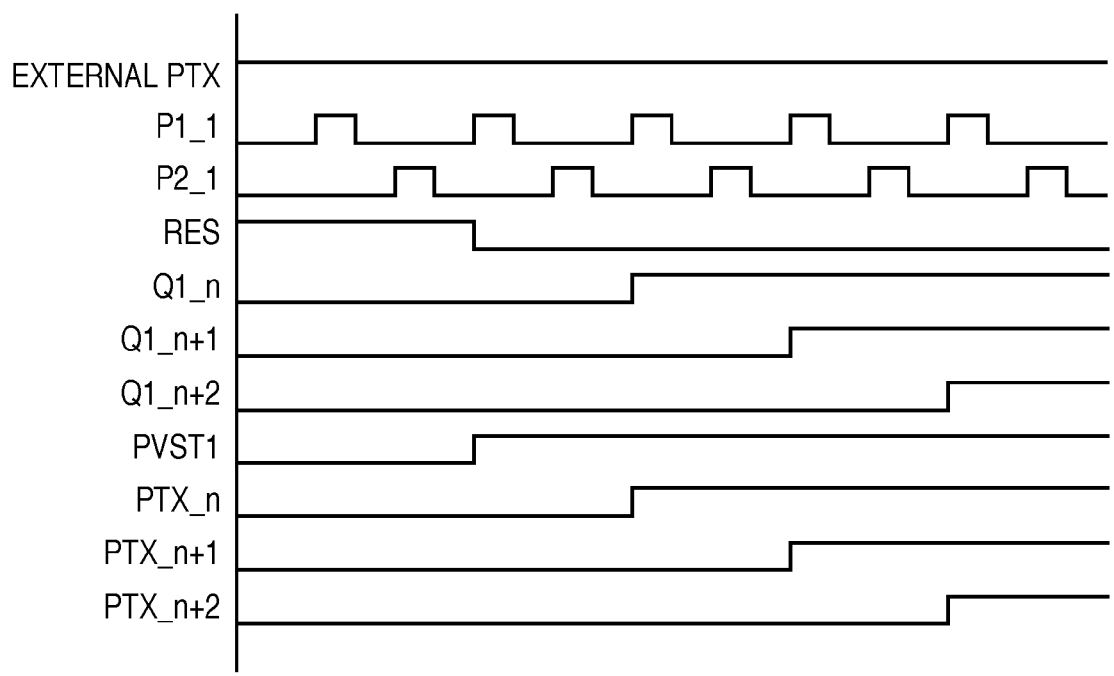
FIG. 23 is a timing chart showing the operation of the vertical scanning unit.
Figure 24:
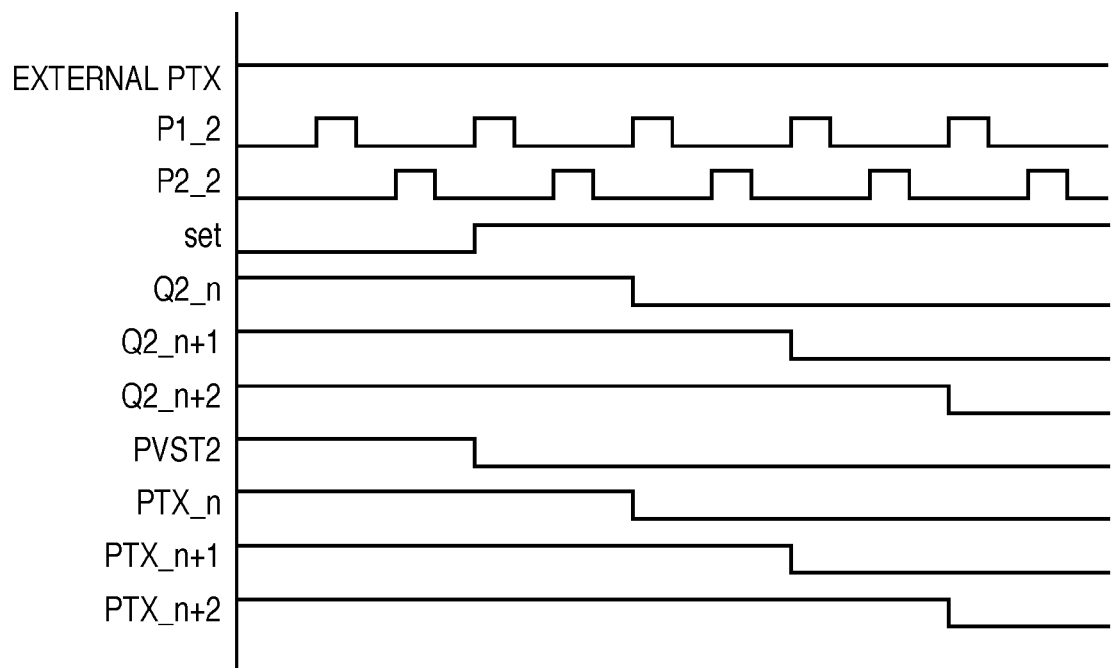
FIG. 24 is a timing chart showing the operation of the vertical scanning unit.
Figure 25:
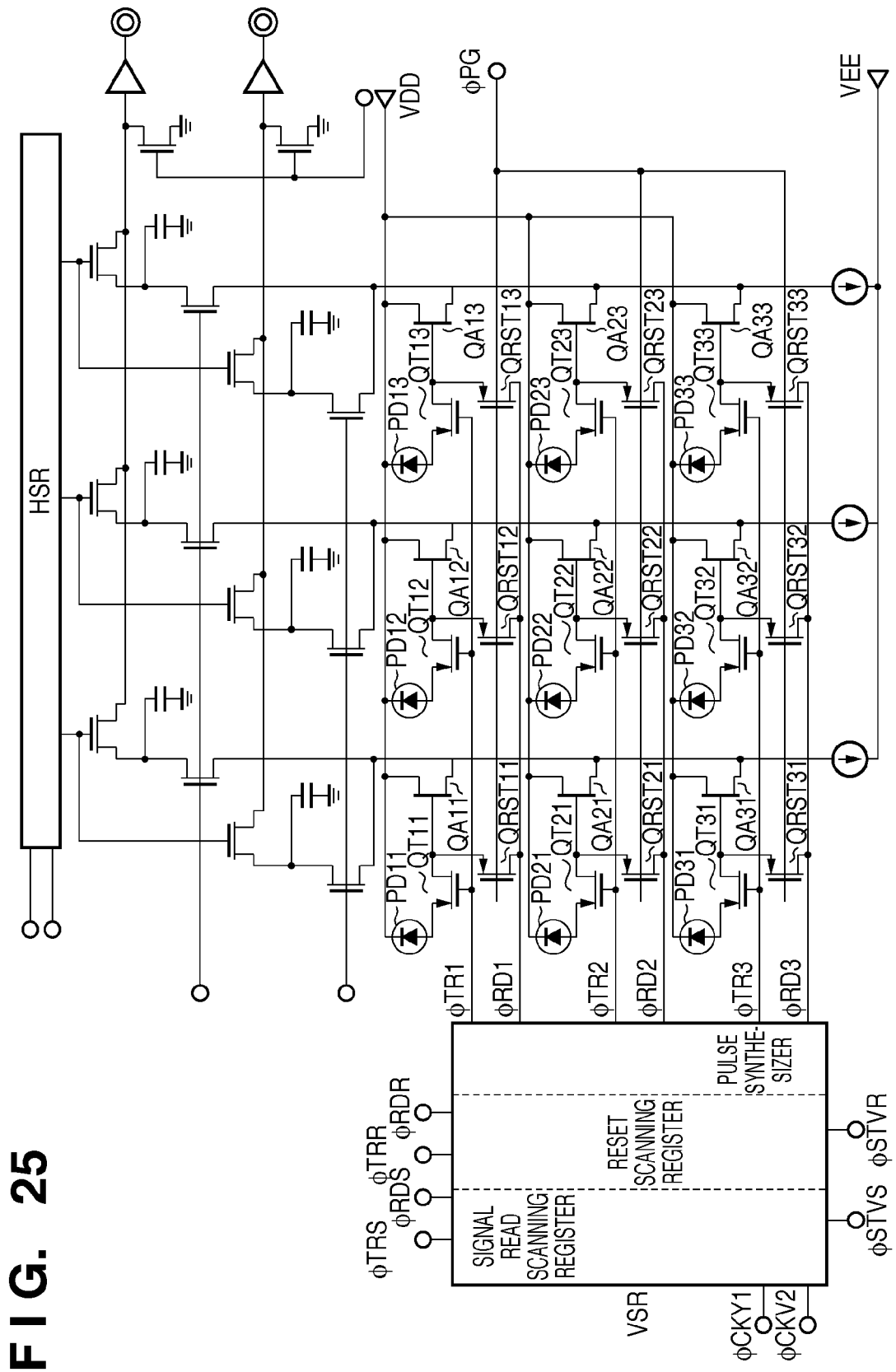
FIG. 25 is a circuit diagram for explaining the prior art.
Figure 26:
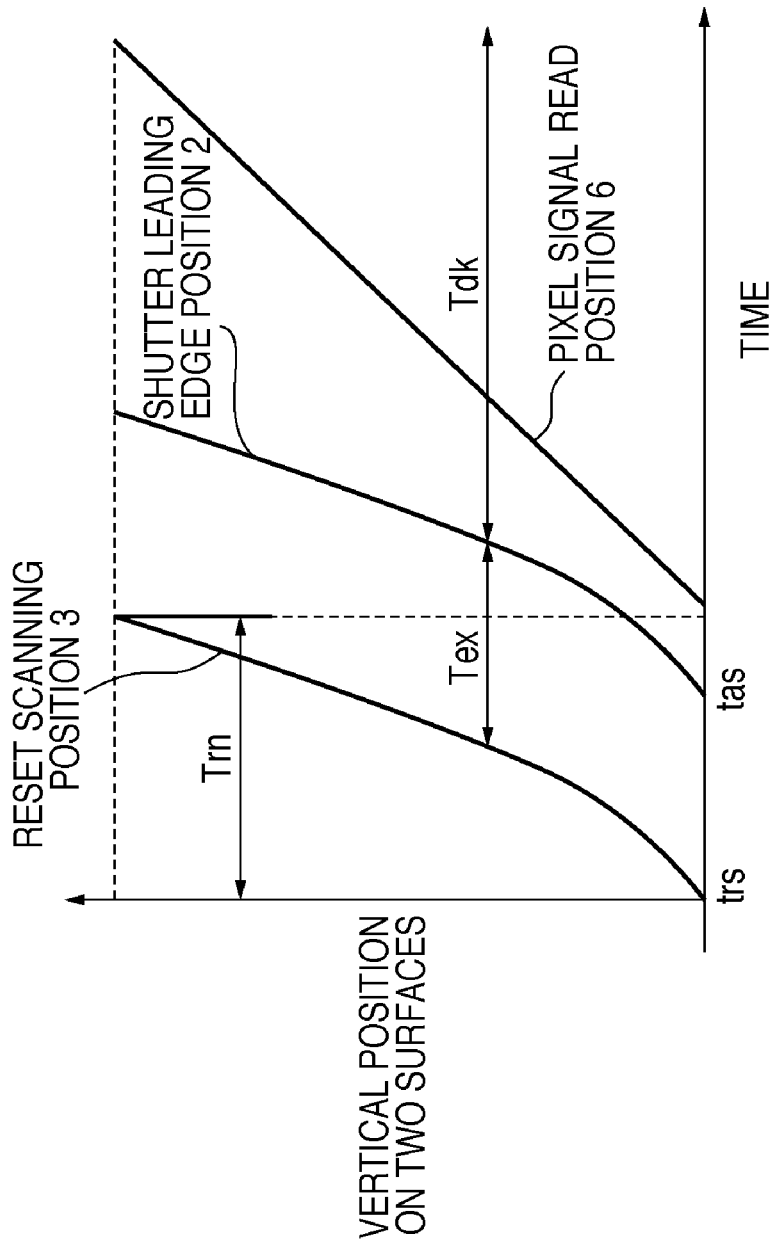
FIG. 26 is a view for explaining the prior art.
Figure 27:
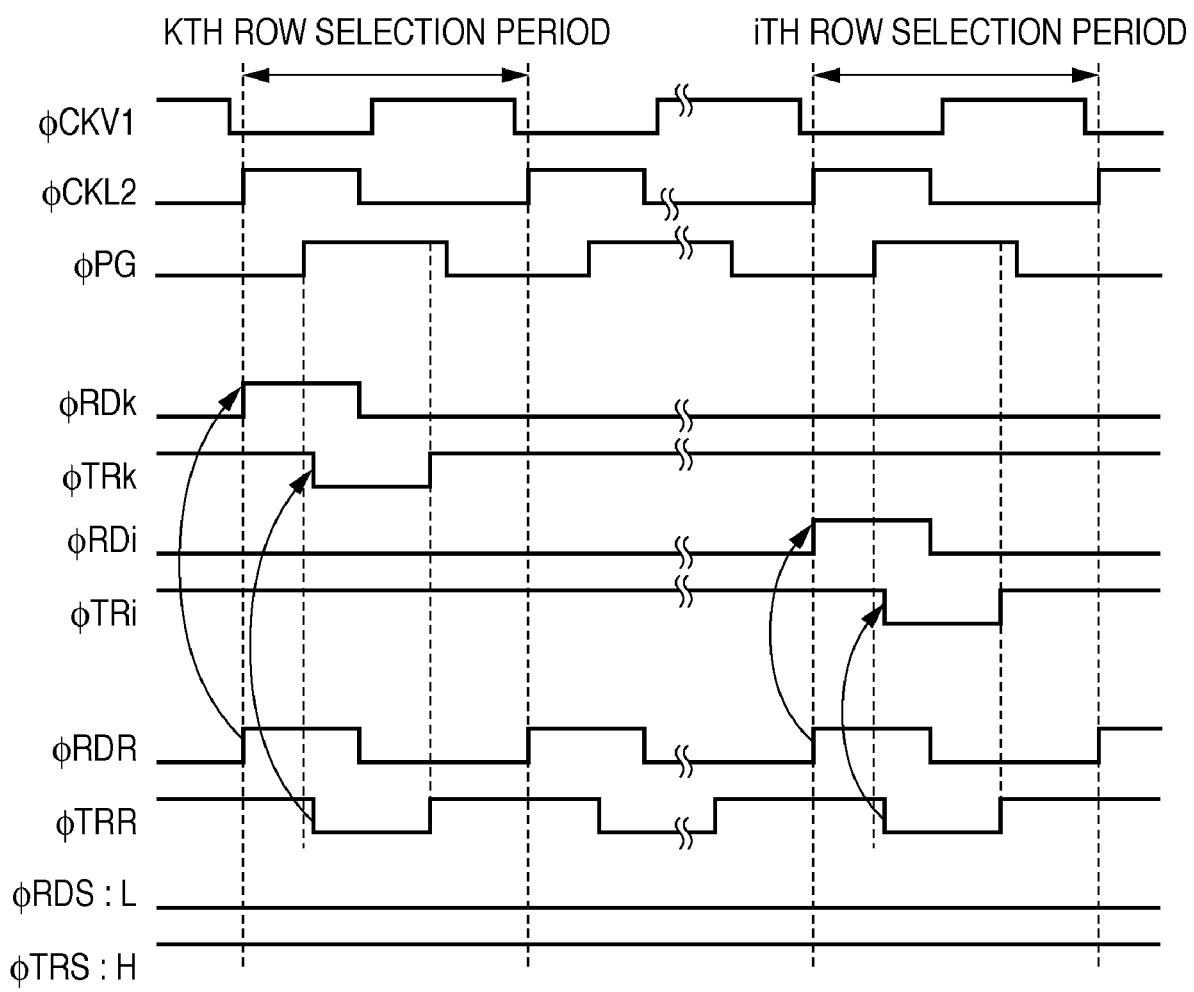
FIG. 27 is a timing chart for explaining the prior art.

The shift register SR2 receives shift pulses P1_2 and P2_2 generated based on the vertical scanning signal PV2. The shift register SR2 also receives inverted shift pulses P1_2B and P2_2B generated by inverting the logics of the shift pulses P1_2 and P2_2. As shown in FIGS. 23 and 24, the shift pulses P1_2 and P2_2 are generated so that their high-level periods do not overlap each other.

The shift register SR2 includes, for example, a logical configuration shown in FIG. 20. In the shift register SR2, the shift pulses P1_2 and P2_2 and inverted shift pulses P1_2B and P2_2B are input to terminals P1_2, P2_2, P1_2B, and P2_2B, respectively. In the shift register SR2, the output Q2 from a preceding shift register SR2, that is, data corresponding to a vertical scanning start pulse PVST2 is input to a terminal D2. Further in the shift register SR2, the pulse PVST2 input to the terminal D2 is output from an output terminal Q2 to a subsequent shift register SR2 via a NAND gate in accordance with the shift pulses P1_2 and P2_2 and inverted shift pulses P1_2B and P2_2B.

The operation of the vertical scanning unit 620 will be explained with reference to FIGS. 21 and 22. FIGS. 21 and 22 are timing charts showing the operation of the vertical scanning unit 620.

The shift register SR1 can preliminarily change the output signals Q1 of all rows to a low level at once because it can forcibly output low-level data by inputting high-level data by a reset signal RES from a NOR gate arranged on the input side of the terminal Q1 (see FIG. 19). More specifically, the reset signals RES simultaneously change from a low level to a high level (active level) in the shift registers SR1 corresponding to pixels on respective rows, as shown in FIG. 21. At this timing, the shift registers SR1 corresponding to pixels on respective rows output output signals Q1_1, Q1_2, . . . which simultaneously change from a high level to a low level.

The shift register SR2 can preliminarily change the output signals Q2 of all rows to a high level at once because it can forcibly output high-level data by inputting low-level data by a set signal set from a NAND gate arranged on the input side of the terminal Q2 (see FIG. 20). More specifically, the set signals set simultaneously change from a high level to a low level (active level) in the shift registers SR2 corresponding to pixels on respective rows, as shown in FIG. 22. At this timing, the shift registers SR2 corresponding to pixels on respective rows output output signals Q2_1, Q2_2, . . . which simultaneously change from a low level to a high level.

At this time, the AND gates AG1 corresponding to pixels on respective rows output low-level signals. In response to this, the AND gates AG2 output transfer signals PTX1, PTX2, . . . of a low level, which is an initial setting, regardless of the logical level of the externally input transfer signal PTX, as shown in FIGS. 21 and 22.

In the shift registers SR1 corresponding to pixels on respective rows, the reset signal RES changes from a high level to a low level (inactive level), as shown in FIG. 23. In response to this, the shift registers SR1 corresponding to pixels on respective rows output output signals Q1_1, Q1_2, . . . which are data obtained by shifting the vertical scanning start pulse PVST1 in accordance with the number of steps.

At this time, the output signals Q2_1, Q2_2, . . . from the shift registers SR2 corresponding to pixels on respective rows remain at a high level. The AND gates AG1 corresponding to pixels on respective rows output signals identical to the output signals Q1_1, Q1_2, . . . The externally input transfer signal PTX remains at a high level, so the AND gates AG2 corresponding to pixels on respective rows output signals identical to the output signals Q1_1, Q1_2, . . . , that is, transfer signals PTX1, PTX2, . . . That is, the vertical scanning unit 620 (first vertical scanning unit 620a) performs reset start scanning sequentially for the pixels of the pixel array PA.

In the shift registers SR2 corresponding to pixels on respective rows, the set signal set changes from a low level to a high level (inactive level), as shown in FIG. 24. In response to this, the shift registers SR2 corresponding to pixels on respective rows output output signals Q2_1, Q2_2, . . . which are data obtained by shifting the vertical scanning start pulse PVST2 in accordance with the number of steps.

At this time, the output signals Q1_1, Q1_2, . . . from the shift registers SR1 corresponding to pixels on respective rows remain at a high level. The AND gates AG1 corresponding to pixels on respective rows output signals identical to the output signals Q2_1, Q2_2, . . . . The externally input transfer signal PTX remains at a high level, so the AND gates AG2 corresponding to pixels on respective rows output signals identical to the output signals Q2_1, Q2_2, . . . , that is, transfer signals PTX1, PTX2, . . . That is, the vertical scanning unit 620 (second vertical scanning unit 620b) performs reset completion scanning sequentially for the pixels of the pixel array PA.

In this way, the vertical scanning unit 620 can independently execute reset start scanning by the first vertical scanning unit 620a and reset completion scanning by the second vertical scanning unit 620b. The vertical scanning unit 620 sequentially starts the reset operations of pixels on at least two adjacent rows (the curve 11c in FIG. 17), and sequentially completes the reset operations of pixels on at least two adjacent rows (see the curve 12 in FIG. 17) before the reset operation of the bottom row starts. Hence, the time until the shutter is released can be easily shortened.

The embodiments have described image sensors having the arrangements shown in FIGS. 4, 8, and 10. However, various modifications are conceivable within the scope of the present invention. For example, an amplifier for amplifying a signal may also be arranged in correspondence with the pixel columns.

The present invention is effective for switching from, for example, a moving image shooting state in which an image is shot by driving both the front and rear curtains by an electronic shutter to, for example, a still image shooting state in which an image is shot by using an electronic shutter as the front curtain and a mechanical shutter as the rear curtain.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-160683, filed Jun. 18, 2007 which is hereby incorporated by reference herein in its entirety.

What is claimed is:

1. An imaging system comprising an image sensor and a mechanical shutter which controls termination of exposure of the image sensor, wherein the image sensor includes
   a pixel array in which a plurality of pixels are arrayed in a matrix, and
   a vertical scanning unit which scans the pixel array for each row,
   the vertical scanning unit executes in parallel at least a part of reset operations of pixels on at least two adjacent rows of the pixel array,
   a charge accumulation operation of pixels starts upon completion of the reset operation and terminates in response to light shielding by the mechanical shutter, and
   the vertical scanning unit executes the reset operations of pixels on at least two adjacent rows of the pixel array to make a period between the start of the reset operation and a completion of the reset operation longer on a row on which a passage speed of a leading edge of the mechanical shutter is lower than on a row on which the passage speed of the leading edge of the mechanical shutter is higher, and sequentially completes the reset operations of the pixels on at least two adjacent rows of the pixel array.

2. The system according to claim 1, wherein:
   the vertical scanning unit sequentially starts the reset operations of pixels on m adjacent rows of the pixel array, completes the reset operation of pixels on a first row at a timing when the reset operation of pixels on an mth row starts, and parallelly executes the reset operations of pixels on m adjacent rows, and
   m is an integer of at least 2 and is smaller than the number of all rows of the pixel array.

3. An imaging system, comprising an image sensor and a mechanical shutter which controls termination of exposure of the image sensor, wherein
   the image sensor includes
   a pixel array in which a plurality of pixels are arrayed in a matrix, and
   a vertical scanning unit which scans the pixel array for each row, the vertical scanning unit executes in parallel at least a part of reset operations of pixels on at least two adjacent rows of the pixel array, a charge accumulation operation of pixels starts upon completion of the reset operation and terminates in response to light shielding by the mechanical shutter, and wherein the vertical scanning unit sequentially starts the reset operations of pixels on m adjacent rows of the pixel array, and makes a reset period of pixels on an initial row on which the reset operation of pixels starts first in the pixel array equal to reset periods of pixels on less than m rows adjacent to the initial row and not equal to reset periods of pixels of other rows of the m adjacent rows, and sequentially completes the reset operations of the pixels on at lest two adjacent rows of the pixel array.

4. An image sensor, comprising a pixel array in which a plurality of pixels for which termination of a charge accumulation operation is determined by a mechanical shutter are arrayed in a matrix, and a vertical scanning unit which scans the pixel array for each row, wherein the vertical scanning unit executes in parallel at least a part of reset operations of pixels on at least two adjacent rows of the pixel array, the charge accumulation operation of pixels starts upon completion of the reset operation, and the vertical scanning unit executes the reset operations of pixels on at least two adjacent rows of the pixel array to make a period between a start of the reset operation and a completion of the reset operation longer on a row on which a passage speed of a leading edge of the mechanical shutter is lower than on a row on which the passage speed of the leading edge of the mechanical shutter is higher, and sequentially completes the reset operations of the pixels on at least two adjacent rows of the pixel array.

* * * * *